(12) United States Patent
Seyama et al.

(10) Patent No.: US 9,191,258 B2
(45) Date of Patent: Nov. 17, 2015

(54) RECEPTION DEVICE AND RECEPTION METHOD

(71) Applicant: FUJITSU LIMITED, Kawasaki-shi, Kanagawa (JP)

(72) Inventors: Takashi Seyama, Kawasaki (JP); Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/143,743

(22) Filed: Dec. 30, 2013

(65) Prior Publication Data

US 2014/0192937 A1    Jul. 10, 2014

(30) Foreign Application Priority Data

Jan. 10, 2013   (JP) .................................. 2013-002608

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04L 27/26 | (2006.01) |
| H04L 25/02 | (2006.01) |

(52) U.S. Cl.
CPC ........ *H04L 27/2647* (2013.01); *H04L 25/0204* (2013.01); *H04L 25/0224* (2013.01)

(58) Field of Classification Search
USPC ......................................................... 375/346
See application file for complete search history.

(56) References Cited

U.S. PATENT DOCUMENTS 7,139,575 B1 * 11/2006 Chen et al. .................... 455/437
2010/0309864 A1   12/2010 Tamaki et al.
2011/0310758 A1   12/2011 Tamaki et al.

FOREIGN PATENT DOCUMENTS

| JP | 2010-283634 A | 12/2010 |
|---|---|---|
| JP | 2012-004924 A | 1/2012 |
| JP | 2012-129793 A | 7/2012 |

* cited by examiner

*Primary Examiner* — Tanmay Shah
(74) *Attorney, Agent, or Firm* — Arent Fox LLP

(57) ABSTRACT

A reception device including: an antenna configured to receive a radio signal including a radio frame that includes a plurality of symbols, and a processor configured to perform a first processing for estimating a first interference noise power for one or more first specified symbols of the plurality of symbols, each of the one or more first specified symbols including each of one or more reference signals respectively, and to perform a second processing for estimating a second interference noise power for one or more second specified symbols of the plurality of symbols, each of the one or more second specified symbols including no reference signal, the second interference noise power differing from the first interference noise power.

15 Claims, 25 Drawing Sheets

CRS

ABSENCE OF SIGNAL

RECEPTION DEVICE AND RECEPTION METHOD

CROSS-REFERENCE TO RELATED APPLICATION

This application is based upon and claims the benefit of priority of the prior Japanese Patent Application No. 2013-002608, filed on Jan. 10, 2013, the entire contents of which are incorporated herein by reference.

FIELD

The embodiments discussed herein are related to estimation of interference noise in a reception device.

BACKGROUND

Channel estimation processing is known in which an orthogonal frequency division multiplexing (OFDM) reception device estimates a communication channel between a transmission device and a reception device on the basis of the reception result of a known reference signal. A channel estimation value is used for demodulation processing of received data. Interference noise power is used for such channel estimation processing and demodulation processing.

In addition, a technology is known by which a radio frame that includes a reference signal and does not include data is transmitted. Such an example is an inter-cell interference control technology that is called enhanced inter-cell interference coordination (eICIC) and is introduced to Long term Evolution (LTE) that is defined on standards of 3rd Generation Partnership Project (3GPP) that is a standards body.

As a technology in the related art, a base station device is known that performs multi-carrier radio communication in a plurality of subcarriers with a plurality of mobile station devices (for example, see Japanese Laid-open Patent Publication No. 2012-004924). The base station device includes a cell environment determination processing unit that estimates an interference amount from neighbor cells, and a scheduler that allocates resources to a mobile station in a unit of sub-band that is constituted by one or a plurality of subcarriers. The base station device includes an inter-cell interference adjustment processing unit that determines transmission power constraint to constrain allocation enabled resources for each of the sub-bands, on the basis of the interference amount estimation result.

In addition, a mobile communication system is known that includes a first base station and a second base station, and in which a protection subframe group is set in the first base station, and pattern information that indicates the protection subframe group is notified from the first base station to the second base station (for example, see Japanese Laid-open Patent Publication No. 2012-129793). The second base station includes a measurement instruction unit that notifies a user device of a radio subframe group that is a part of the protection subframe group and is used for reception quality measurement in the user device. The second base station includes a scheduling unit that allocates communication resource to the user device on the basis of the reception quality measurement result that is received from the user device and the protection subframe group that is indicated in the pattern information that is received from the first base station. The second base station includes a protection subframe usage state calculation unit that calculates a proportion of the number of protection subframes that are allocated for communication in the user device to which the radio subframe group for the reception quality measurement is notified, in the total number of protection subframes in a specific time interval. The second base station includes a protection subframe usage state notification unit that notifies the first base station of the proportion that is calculated by the protection subframe usage state calculation unit, as a protection subframe usage state.

In addition, a signal processing method in a multi-carrier radio communication system that includes a plurality of subcarriers is known (for example, see Japanese Laid-open Patent Publication No. 2010-283634). The signal processing method that includes allocating resources in a unit of resource block that is constituted by one or a plurality of subcarriers, and notifying base stations of inter-cell interference adjustment control information to each other. In addition, the signal processing method includes determining constraint of transmission power for each of the resource blocks in a cell on the basis of the inter-cell interference adjustment control information, and changing the determination of constraint of the transmission power in order from a resource block the constraint of transmission power of which is different from that of an adjacent resource block.

SUMMARY

According to an aspect of the invention, a reception device includes an antenna configured to receive a radio signal including a radio frame that includes a plurality of symbols, and a processor configured to perform a first processing for estimating a first interference noise power for one or more first specified symbols of the plurality of symbols, each of the one or more first specified symbols including each of one or more reference signals respectively, and to perform a second processing for estimating a second interference noise power for one or more second specified symbols of the plurality of symbols, each of the one or more second specified symbols including no reference signal, the second interference noise power differing from the first interference noise power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When interference is received from a cell to which a radio frame that includes a reference signal and does not include data is transmitted, interference noise power is changed depending on an OFDM symbol even in the same radio frame. Therefore, when channel estimation processing or demodulation processing is executed using interference noise power that is estimated for each radio frame, an error occurs due to inconsistency between a used estimation value and actual interference noise power.

An object of a device or a method discussed herein is to reduce an error in the channel estimation processing or demodulation processing when interference noise power is changed depending on an OFDM symbol even in the same radio frame.

1. Communication System

Figure 1:
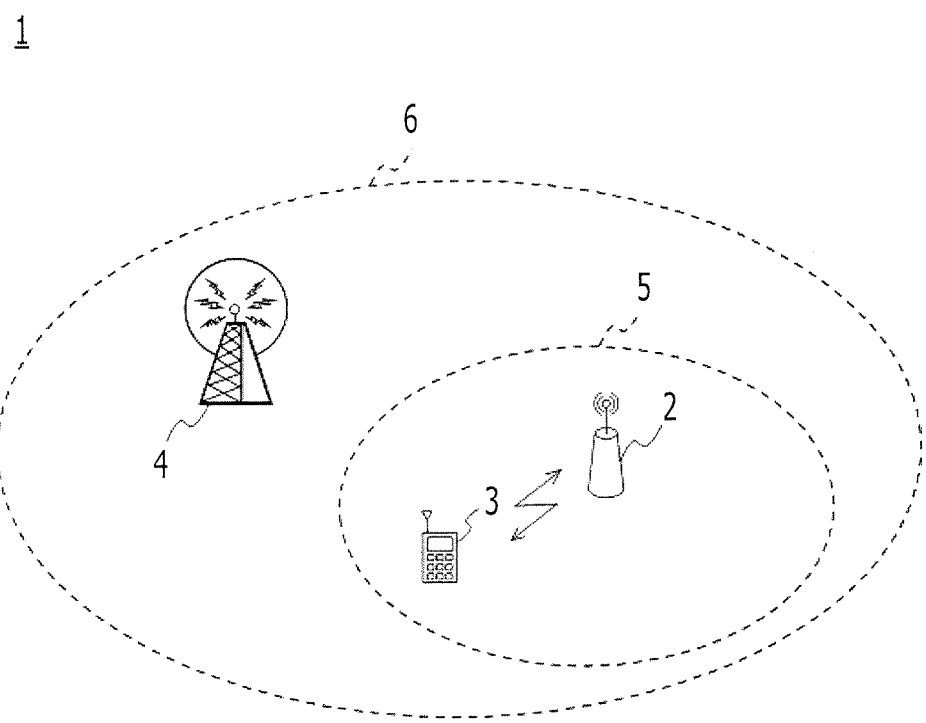
FIG. 1 is a diagram illustrating a configuration example of a communication system.

The embodiments are described below with reference to accompanying drawings. FIG. 1 is a diagram illustrating a configuration example of a communication system. A communication system 1 includes a pico base station device 2, a mobile station device 3, and a macro base station device 4. Hereinafter, a base station device and a mobile station device may be referred to as "base station" and "mobile station", respectively.

The pico base station 2 and the macro base station 4 are communication devices that perform radio communication with the mobile station 3 through radio connection. The pico base station 2 and the macro base station 4 may provide various services such as sound communication and video delivery for the mobile station 3 in one or plurality of cells. A radio access scheme in a downlink in which transmission is performed from the pico base station 2 and the macro base station 4 to the mobile station 3 corresponds to an OFDM scheme.

Hereinafter, an example of a case in which the communication system 1 is in compliance with LTE that is defined in standards of 3GPP is used. However, in this example, it is not intended that the communication system discussed herein is merely applied to a communication system that is in compliance with LTE. The communication system discussed herein may be widely applied in an OFDM communication system in which a radio frame that includes a reference signal and does not include data is transmitted.

Figure 2:
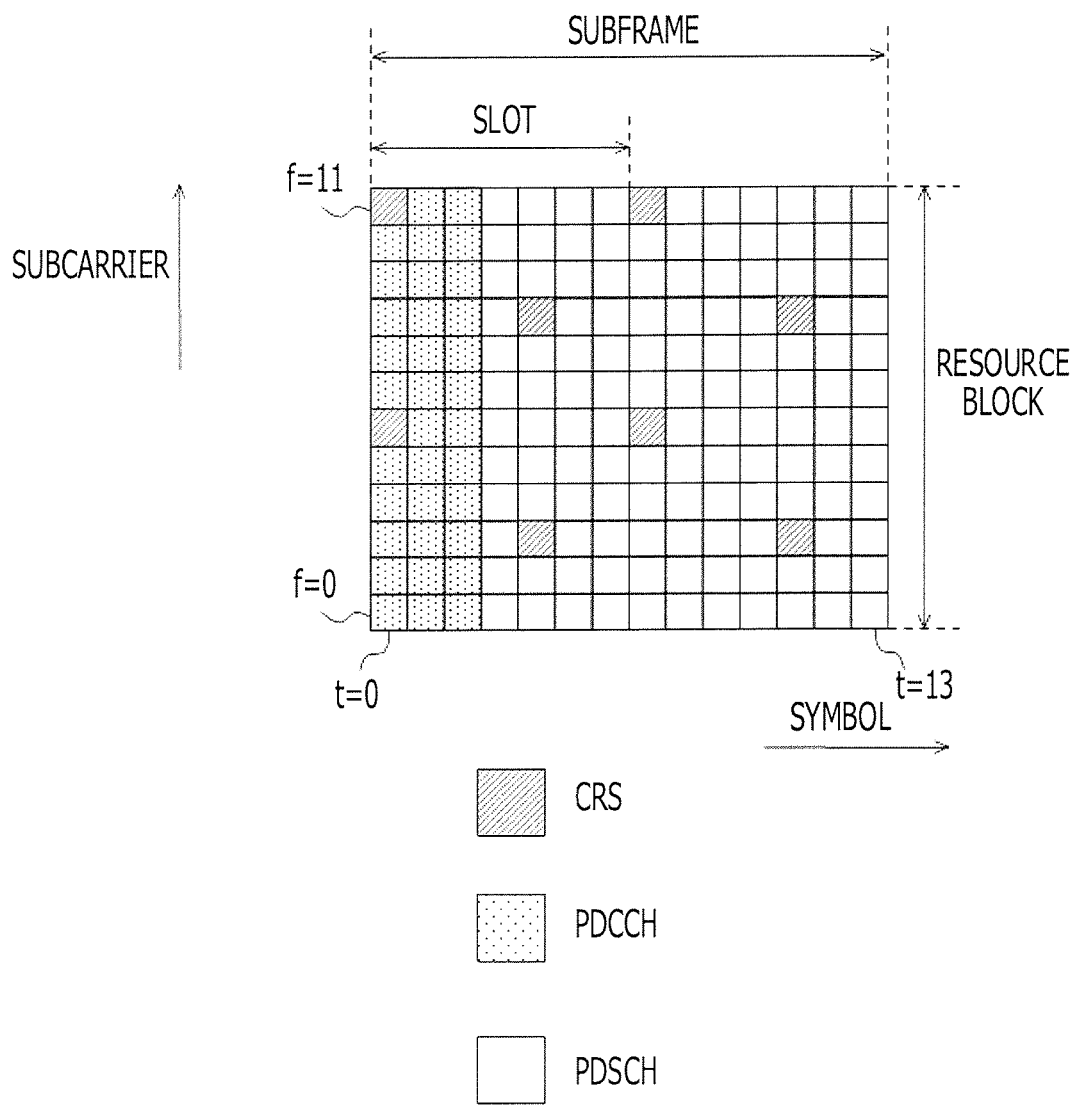
FIG. 2 is a diagram illustrating an example of a downlink transmission format.

FIG. 2 is a diagram illustrating an example of a downlink transmission format. A transmission format is represented by a two-dimensional space that includes a time axis and a frequency axis, and the time axis direction is represented by units such as an OFDM symbol, a slot, and a subframe. The slot includes seven OFDM symbols. The subframe includes two slots.

In addition, the frequency axis direction is represented by units such as a subcarrier and a resource block (RB). The RB includes 12 subcarriers. In the illustrated example, a cell-specific reference signal is mapped at the leading OFDM symbol of the slot and at an OFDM symbol that is the fourth symbol from the leading OFDM symbol. In FIG. 2, a symbol and a carrier in which a reference signal is arranged are illustrated by an area that is diagonally shaded. Hereinafter, a cell-specific reference signal may be referred to as "CRS".

A physical downlink control channel (PDCCH) in which a control channel is mapped is arranged in the leading of a subframe. In the illustrated example, the PDCCH is arranged in the leading three OFDM symbols that are dotted. In the remaining radio resources, a physical downlink shared channel (PDSCH) in which data for the mobile station 3 is mapped is arranged.

Hereinafter, symbol numbers "t" that specify OFDM symbols are respectively referred to as "0" to "13" in order from the leading OFDM symbol of each of the subframes. The OFDM symbol having the symbol number t=0 is referred to as the 0th OFDM symbol. Similarly, the OFDM symbols having the symbol numbers t=1 to 13 are respectively referred to as the first to thirteenth OFDM symbols.

In addition, subcarrier numbers "f" that specify subcarriers are respectively referred to as "0" to "11" in order from a subcarrier having the lowest frequency of each of the resource blocks. A subcarrier having the subcarrier number f=0 is referred to as the 0th subcarrier. Similarly, the subcarriers having the subcarrier numbers f=1 to 11 are respectively referred to as the first to eleventh subcarriers.

Referring to FIG. 1, a case is assumed in which a certain pico cell 5 that is a radio communication zone of the pico base station 2 and a macro cell 6 that is a radio communication zone of the macro base station 4 are overlapped with each other. In this case, the mobile station 3 that is connected to the pico base station 2 may receive interference from the macro cell 6.

In the above-described eICIC, in order to reduce interference from the macro cell 6, the macro base station 4 performs scheduling on a subframe with which transmission of data is not performed, which is called an almost blank subframe (ABS). The pico base station 2 transmits data to the mobile station 3 with a subframe on which the macro base station 4 performs scheduling of an ABS. However, the macro base station 4 transmits a CRS even with the ABS.

Figure 3A:
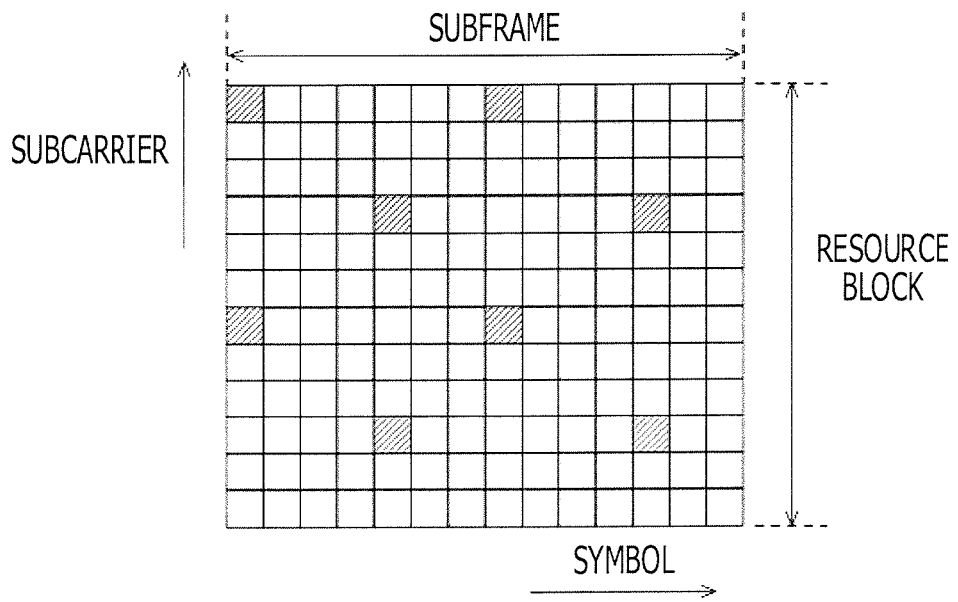
FIG. 3A is a diagram illustrating an example of a transmission format of an Non-MBSFN ABS.
Figure 3B:
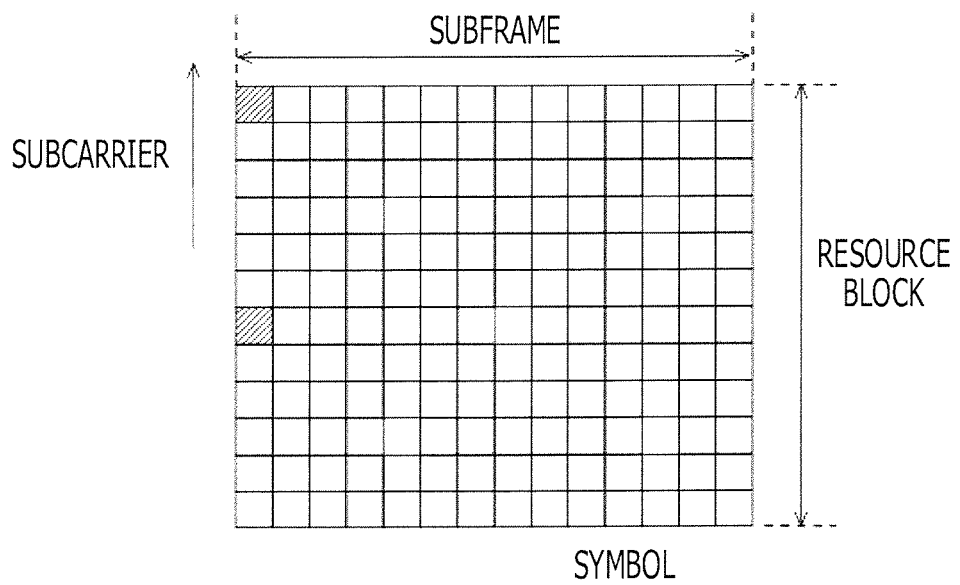
FIG. 3B is a diagram illustrating an example of a transmission format of an MBSFN ABS.
Figure 3B:
Figure 3B:

As the type of an ABS, a Non-MBSFN ABS and an MBSFN ABS are known. FIG. 3A is a diagram illustrating an example of a transmission format of the Non-MBSFN ABS. In the Non-MBSFN ABS, CRSs are transmitted using the 0th, fourth, seventh, and eleventh OFDM symbols. FIG. 3B is a diagram illustrating an example of a transmission format of the MBSFN ABS. In the MBSFN ABS, CRSs are transmitted merely using the 0th OFDM symbol.

In the ABS, data is not transmitted and the CRSs are transmitted, so that interference noise power in the mobile station 3 is changed depending on an OFDM symbol. A case is assumed in which a macro cell having the largest reception power for the mobile station 3 transmits a Non-MBSFN ABS, and a CRS of the macro cell and a CRS of a pico cell are not collided with each other on the frequency axis. Hereinafter, the macro cell having the largest reception power may be referred to as "dominant macro cell". In addition, macro cells other than the dominant macro cell may be referred to as "other macro cells".

Figure 4A:
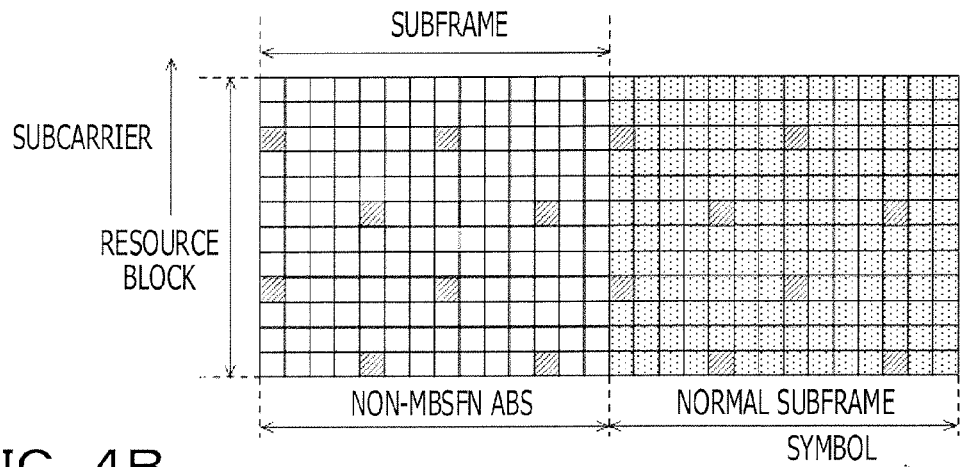
FIG. 4A is a diagram illustrating a subframe that is transmitted from a dominant macro cell that transmits an Non-MBSFN ABS.
Figure 4B:
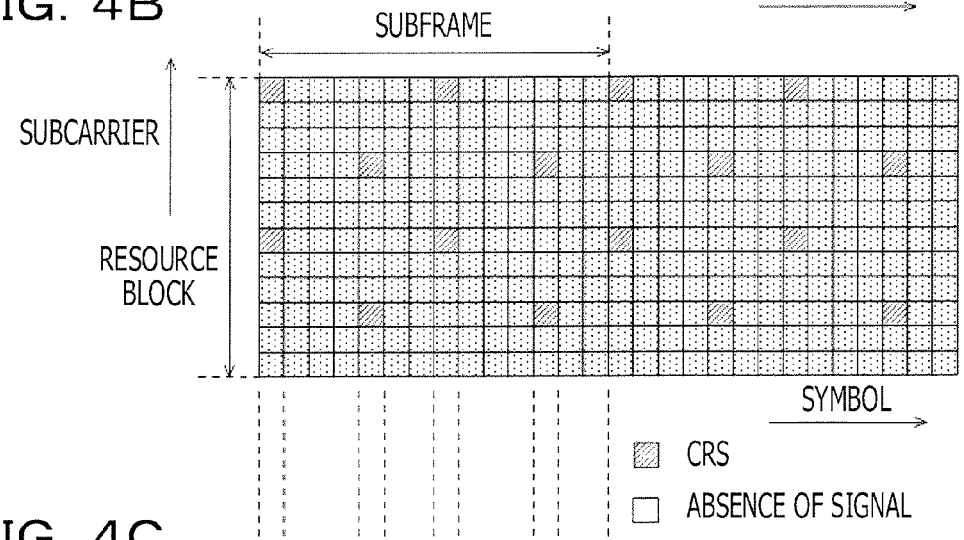
FIG. 4B is a diagram illustrating a subframe that is transmitted from a pico cell.
Figure 4C:
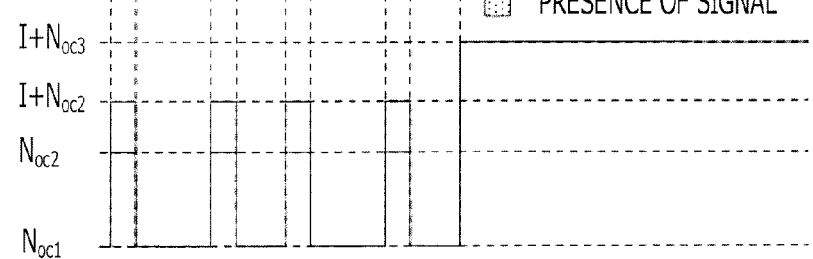
FIG. 4C is a diagram illustrating an example of interference noise power.

FIG. 4A is a diagram illustrating a subframe that is transmitted from a dominant macro cell that transmits a Non-MBSFN ABS. FIG. 4B is a diagram illustrating a subframe that is transmitted from a pico cell. FIG. 4C is a diagram illustrating an example of interference noise power.

Reception power of a signal that is transmitted from the dominant macro cell is represented as "I". In an ABS, in a subcarrier in which collision of a CRS of the dominant macro cell does not occur in an OFDM symbol that includes a CRS, interference noise of "$N_{OC2}$" is received due to thermal noise and interference caused by a CRS that is transmitted from other macro cells. In the subcarrier in which collision of a CRS of the dominant macro cell occurs in the OFDM symbol that includes a CRS, interference noise of "I+$N_{OC2}$" is received.

In addition, in an OFDM symbol that does not include a CRS, interference noise of "$N_{OC1}$" is received due to thermal noise. In addition, in a time period in which a macro cell transmits a normal subframe, interference noise of "I+$N_{OC3}$" is received due to interference of the dominant macro cell and interference of the other macro cells, in all OFDM symbols.

Figure 5A:
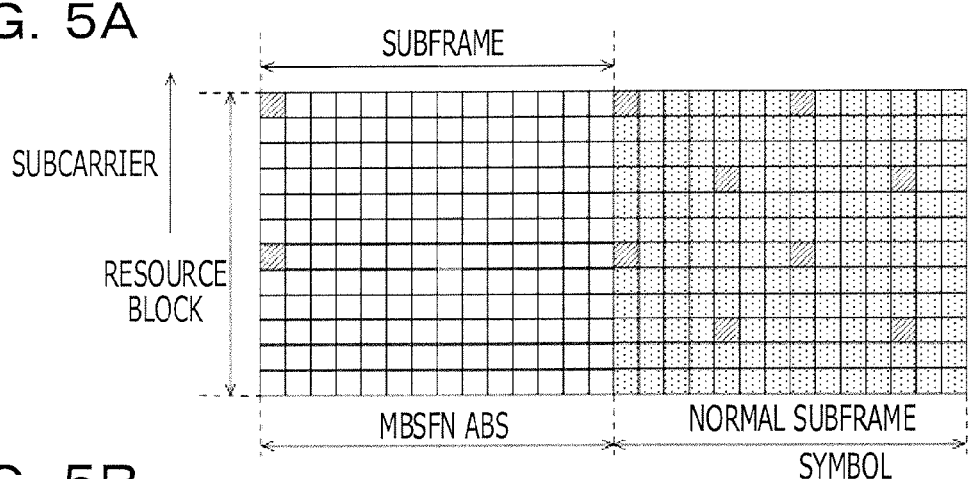
FIG. 5A is a diagram illustrating a subframe that is transmitted from a dominant macro cell that transmits an MBSFN ABS.
Figure 5B:
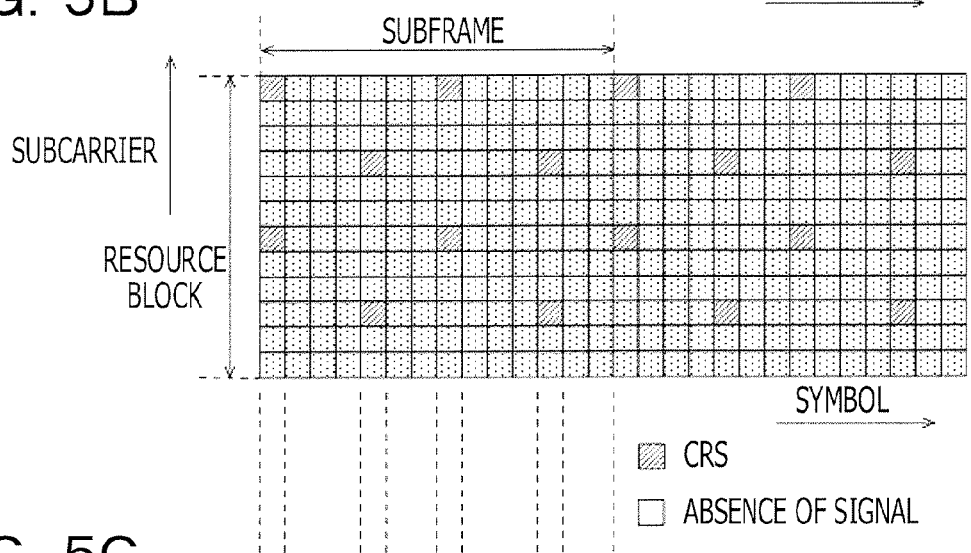
FIG. 5B is a diagram illustrating a subframe that is transmitted from a pico cell.
Figure 5C:
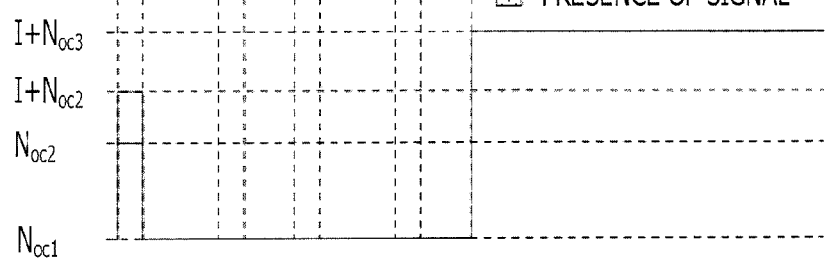
FIG. 5C is a diagram illustrating an example of interference noise power.

Next, a case is assumed in which the dominant macro cell transmits an MBSFN ABS, a CRS of the macro cell and a CRS of the pico cell are collided with each other on the frequency axis. FIG. 5A is a diagram illustrating a subframe that is transmitted from the dominant macro cell that transmits an MBSFN ABS. FIG. 5B is a diagram illustrating a subframe that is transmitted from a pico cell. FIG. 5C is a diagram illustrating an example of interference noise power.

In a CRS subcarrier of the leading OFDM symbol in a subframe for which the dominant macro cell transmits an ABS, CRSs are collided with each other, so that interference noise of "I+$N_{OC2}$" is received. In subcarriers other than the CRS subcarrier of the leading OFDM symbol, interference noise of "$N_{OC2}$" is received.

In an OFDM symbol that includes a CRS and is not the leading OFDM symbol, interference noise of "$N_{OC1}$" is received similar to an OFDM symbol that does not include a CRS because a CRS is not transmitted from the macro cell. Therefore, interference noise power is different between the CRS subcarrier of the leading OFDM symbol and the CRS subcarrier of the OFDM symbol, which is not the CRS subcarrier of the leading OFDM symbol.

As described above, interference noise power is different depending on an OFDM symbol even in the same subframe in the ABS. Therefore, when the channel estimation processing or the demodulation processing is executed using an estimation value of common interference noise power among all OFDM symbols in the ABS, an error occurs due to inconsistency between a used estimation value and the actual interference noise power.

Therefore, in the communication system 1 discussed herein, in an ABS, different interference noise power is estimated between an OFDM symbol that includes a CRS and an OFDM symbol that includes a CRS. In the channel estimation processing or the demodulation processing, interference noise power of an OFDM symbol to which a radio resource that is a processing target belongs is used. For example, in the communication system 1, interference noise power of the following (1) to (3) may be estimated.

(1) Interference noise power (that may be referred to as third interference noise power) of the leading OFDM symbol (that may be referred to as third specified OFDM symbol) in a subframe (2) Interference noise power (that may be referred to as fourth interference noise power) of an OFDM symbol that includes a CRS and is not the leading OFDM symbol (that may be referred to as fourth specified OFDM symbol) in the subframe (3) Interference noise power (that may be referred to as second interference noise power) of one or more OFDM symbols (that may be referred to as second specified OFDM symbols) that does not include a CRS Hereinafter, the leading OFDM symbol in a subframe may be referred to as "leading OFDM symbol". The third interference noise power and the fourth interference noise power may be collectively referred to as first interference noise power. The third specified OFDM symbol and the fourth specified OFDM symbol may be collectively referred to as one or more first specified OFDM symbols.

2.1. Configuration in a First Embodiment

Figure 6:
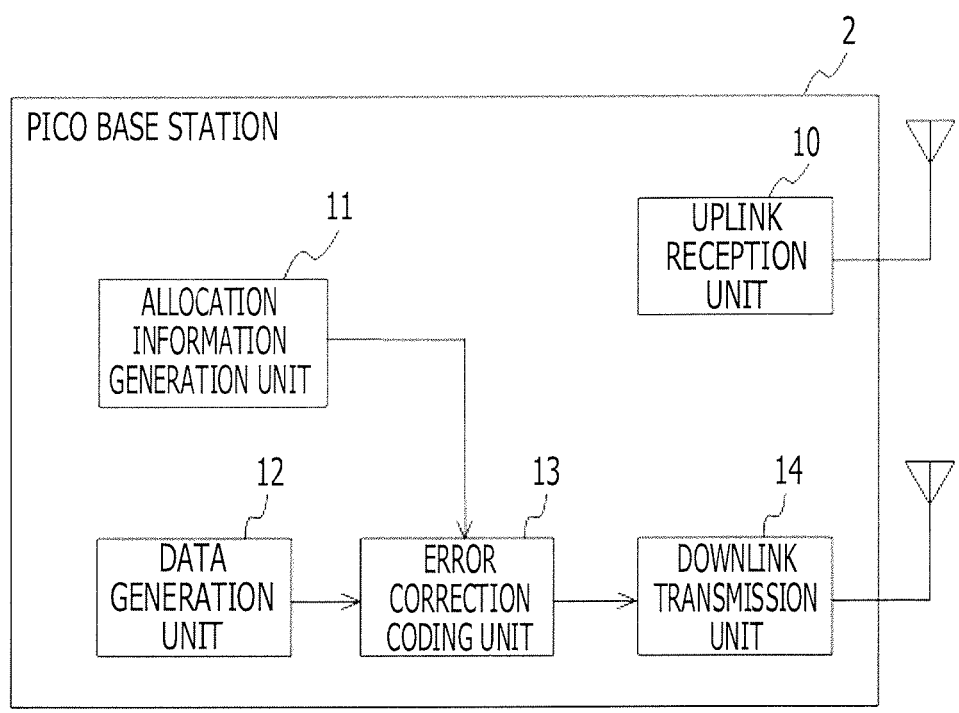
FIG. 6 is a functional block diagram illustrating an example of a pico base station device.

FIG. 6 is a functional block diagram illustrating an example of the pico base station device 2. The pico base station 2 includes an uplink reception unit 10, an allocation information generation unit 11, a data generation unit 12, an error correction coding unit 13, and a downlink transmission unit 14.

The uplink reception unit 10 receives an uplink signal that is transmitted from the mobile station 3. The allocation information generation unit 11 generates allocation information on a subframe to which there is possibility that the macro base station 4 that forms the macro cell 6 allocates an ABS and inputs the allocation information to the error correction coding unit 13. The data generation unit 12 generates downlink data that is transmitted to the mobile station and inputs the downlink data to the error correction coding unit 13.

The error correction coding unit 13 performs error correction coding on the input downlink data and the allocation information. The downlink transmission unit 14 performs modulation of input coding data, inverse fast fourier transformation processing, and the like to generate a downlink signal that is an OFDM signal, and transmits the downlink signal to the mobile station 3 from an antenna. The pico base station 2 may transmit the allocation information to the mobile station 3, for example, as radio resource control (RRC) information.

Figure 7:
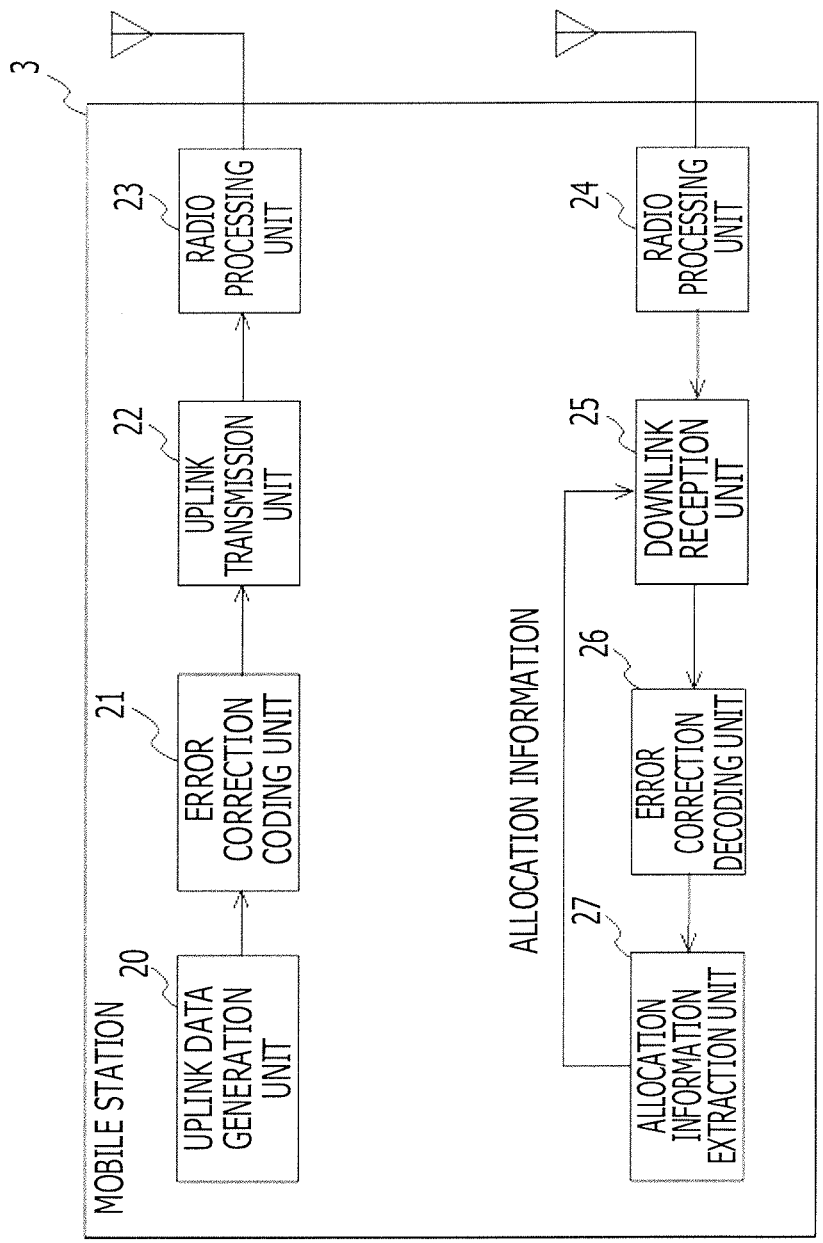
FIG. 7 is a functional block diagram illustrating an example of a mobile station device.

FIG. 7 is a functional block diagram illustrating an example of the mobile station 3. The mobile station 3 includes an uplink data generation unit 20, an error correction coding unit 21, an uplink transmission unit 22, and radio processing units 23 and 24. In addition, the mobile station 3 includes a downlink reception unit 25, an error correction decoding unit 26, and an allocation information extraction unit 27.

The uplink data generation unit 20 generates uplink data to be transmitted to the pico base station 2 and inputs the uplink data to the error correction coding unit 21. The error correction coding unit the 21 performs error correction coding on the input uplink data. The uplink transmission unit 22 performs modulation of coding data and the like to generate an uplink signal. In addition, the uplink transmission unit 22 transmits the uplink signal from the antenna to the pico base station 2 through the radio processing unit 23.

The radio processing unit 24 performs downconversion, analogue/digital conversion, and the like of a downlink signal that is received at the antenna. The downlink reception unit 25 receives the downlink signal. The error correction decoding unit 26 performs error correction decoding processing on the downlink signal to reproduce data. The allocation information extraction unit 27 inputs allocation information that is included in the reproduced data, to the downlink reception unit 25.

Figure 8:
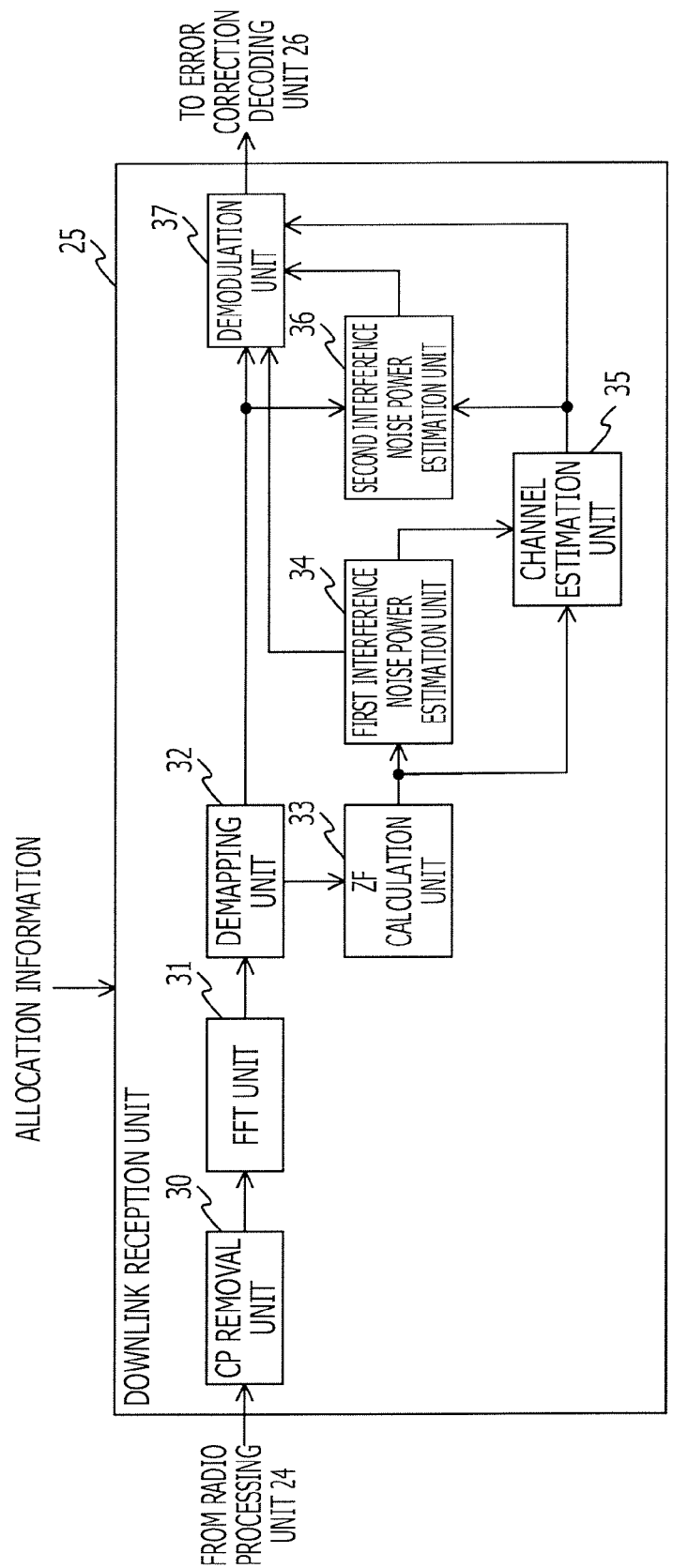
FIG. 8 is a functional block diagram illustrating a first example of a downlink reception unit.

FIG. 8 is a functional block diagram illustrating a first example of the downlink reception unit 25. The downlink reception unit 25 includes a cyclic prefix (CP) removal unit 30, a fast fourier transform (FFT) unit 31, a demapping unit 32, and a zero-forcing (ZF) calculation unit 33. The downlink reception unit 25 includes a first interference noise power estimation unit 34, a channel estimation unit 35, a second interference noise power estimation unit 36, and a demodulation unit 37.

An operation of the downlink reception unit 25 is different depending on allocation information that is notified from the allocation information extraction unit 27. First, a function of each of the configuration elements in a case in which a reception target subframe corresponds to an ABS is described below.

The CP removal unit 30 removes a CP of a received signal. The FFT unit 31 transforms the received signal from which the CP is removed, into a signal of a frequency domain by FFT processing. The demapping unit 32 extracts a received signal of a data portion and a received signal of a CRS portion from the signal of the frequency domain, and inputs the received signal of the data portion to the demodulation unit 37 and the second interference noise power estimation unit 36. The demapping unit 32 inputs the received signal of the CRS portion to the ZF calculation unit 33.

The ZF calculation unit 33 multiplies the received signal of the CRS portion by complex conjugate of a pattern of the original CRS to obtain a ZF value. The ZF calculation unit 33 inputs the obtained ZF value to the first interference noise power estimation unit 34.

The first interference noise power estimation unit 34 estimates interference noise power estimation value $M_{OC2,est1}$ in the leading OFDM symbol and interference noise power estimation value $M_{OC2,est2}$ in an OFDM symbol that includes a CRS and is not the leading OFDM symbol, using the ZF value. The first interference noise power estimation unit 34 inputs the interference noise power estimation values $M_{OC2,est1}$ and $M_{OC2,est2}$ to the channel estimation unit 35 and the demodulation unit 37.

Figure 9:
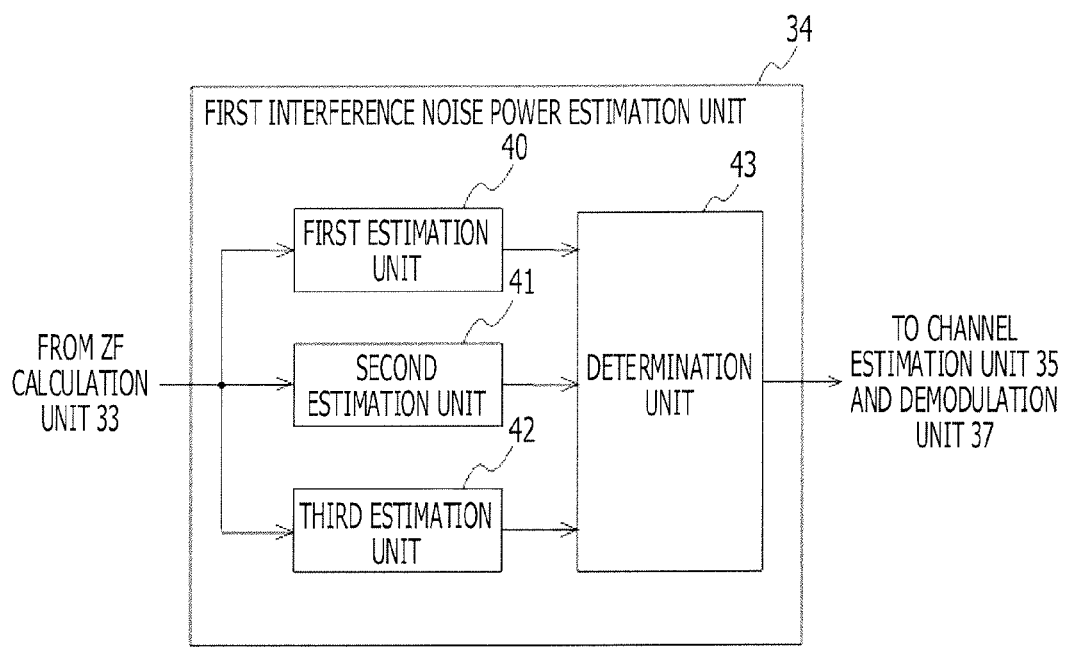
FIG. 9 is a functional block diagram illustrating a first example of a first interference noise power estimation unit.

FIG. 9 is a functional block diagram illustrating a first example of the first interference noise power estimation unit 34. The first interference noise power estimation unit 34 includes a first estimation unit 40, a second estimation unit 41, a third estimation unit 42, and a determination unit 43.

The first estimation unit 40 calculates an estimation value $\sigma_{est1}^2$ of the interference noise power in the leading OFDM symbol, from a ZF value of a CRS in the leading OFDM symbol. The second estimation unit 41 calculates an estimation value $\sigma_{est2}^2$ of the interference noise power in the OFDM symbol that includes a CRS and is not the leading OFDM symbol, from a ZF value of a CRS in the fourth OFDM symbol.

The first estimation unit 40 and the second estimation unit 41 may calculate an average of values each of which is obtained by converting a difference between ZF values of adjacent CRSs in the frequency axis direction into a power value, as the estimation values $\sigma_{est1}^2$ and $\sigma_{est2}^2$, for example, as illustrated in the following formulas (1) and (2).

$$\sigma_{est1}^2 = \frac{1}{2N_{rx}\min(N_{tx},2)(N_{sc}/\Delta f - 1)} \sum_{i=0}^{N_{rx}-1} \sum_{j=0}^{\min(N_{tx},2)-1} \sum_{n=0}^{N_{sc}/\Delta f - 1} \quad (1)$$

$$|h_{ij}^{(ZF)}(0, n\Delta f + \text{shift}_0(j)) - h_{ij}^{(ZF)}(0, (n+1)\Delta f + \text{shift}_0(j))|^2$$

$$\sigma_{est2}^2 = \frac{1}{2N_{rx}\min(N_{tx},2)(N_{sc}/\Delta f - 1)} \sum_{i=0}^{N_{rx}-1} \sum_{j=0}^{\min(N_{tx},2)-1} \sum_{n=0}^{N_{sc}/\Delta f - 1} \quad (2)$$

$$|h_{ij}^{(ZF)}(4, n\Delta f + \text{shift}_1(j)) - h_{ij}^{(ZF)}(4, (n+1)\Delta f + \text{shift}_1(j))|^2$$

In the formulas (1) and (2), "$N_{sc}$" represents the number of subcarriers, and "$\Delta f$" represents a subcarrier interval of CRSs. In addition, "$h_{ij}^{(ZF)}(t,f)$" represents a ZF value between the j-th transmission antenna of the base station and the i-th reception antenna of the mobile station in the f-th subcarrier of the t-th OFDM symbol.

In addition, "$N_{rx}$" represents the number of reception antennas in the mobile station, "$N_{tx}$" represents the number of transmission antenna in the base station, and "$\text{shift}_0(j)$" represents a frequency shift of a CRS that is transmitted from the j-th transmission antenna in the leading OFDM symbol. In addition, "$\text{shift}_1(j)$" represents a frequency shift of a CRS that is transmitted from the j-th transmission antenna in an OFDM symbol in which "t=4" is satisfied.

Figure 10:
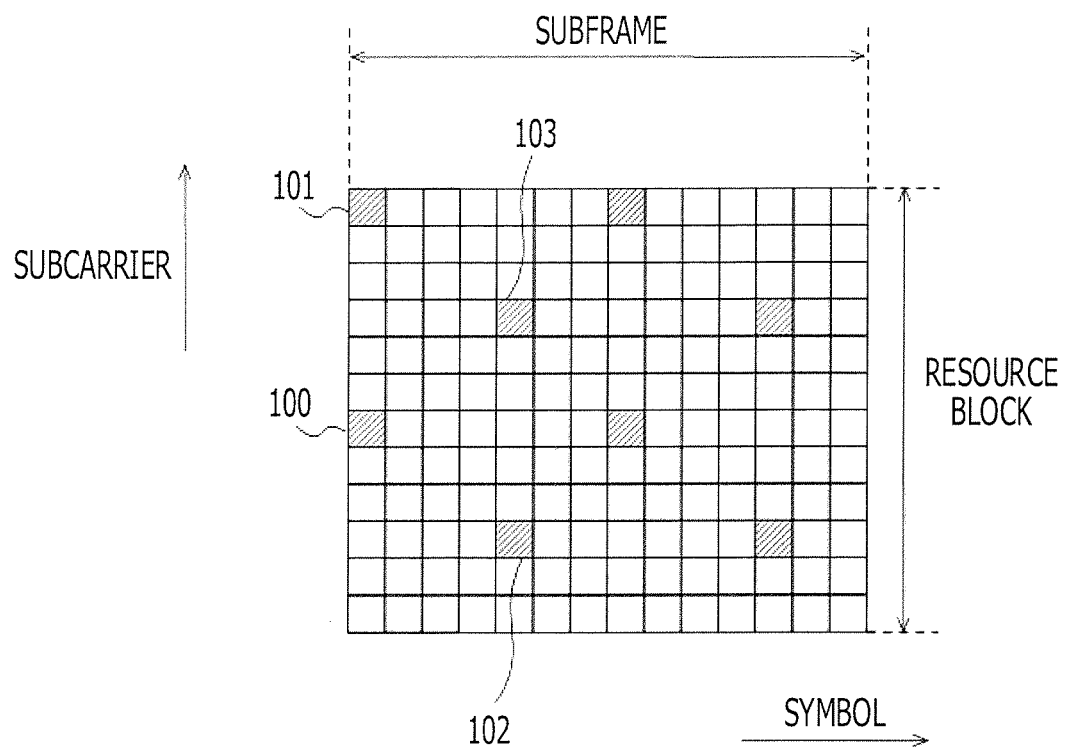
FIG. 10 is a diagram illustrating locations of radio resources in which interference noise power $\sigma_{est1}^2$ and interference noise power $\sigma_{est2}^2$ are calculated.

FIG. 10 is a diagram illustrating locations of radio resources in which interference noise power $\sigma_{est1}^2$ and interference noise power $\sigma_{est2}^2$ are calculated. A case is assumed in which CRSs are allocated to the radio resources 100, 101, 102, and 103. The radio resources 100 and 101 correspond to the leading OFDM symbol, that is, corresponds to the fifth and eleventh subcarriers in the 0th OFDM symbol. The radio resources 102 and 103 correspond to the second and eighth subcarriers in the fourth OFDM symbol.

The example of "$\delta h_{ij}^{(ZF)}(0,n\Delta f+\text{shift}_0(j))$" in the formula (1) corresponds to a ZF value of the CRS that is allocated in the radio resource 100 in which "t=0" and "f=5" are satisfied. The example of "$h_{ij}^{(ZF)}(0,(n+1)\Delta f+\text{shift}_0(j))$" corresponds to a ZF value of the CRS that is allocated in the radio resource 101 in which "t=0" and "f=11" are satisfied. The example of "$h_{ij}^{(ZF)}(0,n\Delta f+\text{shift}_0(j))-h_{ij}^{(ZF)}(0,(n+1)\Delta f+\text{shift}_0(j))$" corresponds to a difference between the ZF values of the adjacent CRSs in the frequency axis direction, which are allocated to the radio resources 100 and 101, respectively.

The example of "$h_{ij}^{(ZF)}(4,n\Delta f+\text{shift}_1(j))$" in the formula (2) corresponds to a ZF value of the CRS that is allocated in the radio resource 102 in which "t=4" and "f=2" are satisfied. The example of "$h_{ij}^{(ZF)}(4,(n+1)\Delta f+\text{shift}_1(j))$" corresponds to a ZF value of the CRS that is allocated in the radio resource 103 in which "t=4" and "f=8" are satisfied. The example of "$h_{ij}^{(ZF)}(4,n\Delta f+\text{shift}_1(j))-h_{ij}^{(ZF)}(4,(n+1)\Delta f+\text{shift}_1(j))$" corresponds to a difference between the ZF values of the adjacent CRSs in the frequency axis direction, which are allocated to the radio resources 102 and 103, respectively.

Referring to FIG. 9, the first estimation unit 40 and the second estimation unit 41 respectively input the estimation values $\sigma_{est1}^2$ and $\sigma_{est2}^2$ to the determination unit 43. The second estimation unit 41 may calculate the estimation value $\sigma_{est2}^2$ from a ZF value of a CRS that is allocated to the seventh or eleventh OFDM symbol instead of the fourth OFDM symbol.

The third estimation unit 42 calculates a common estimation value $\sigma_X^2$ (that may be referred to as fifth interference noise power) of interference noise power in the leading OFDM symbol and the fourth OFDM symbol. The third estimation unit 42 calculates the common estimation value $\sigma_X^2$, for example, in accordance with the following formula (3). The third estimation unit 42 may calculate an average of values each of which is obtained by converting a difference between an average of ZF values of a combination in which frequencies are the farthest, out of combinations of CRSs in the leading OFDM symbol and the fourth OFDM symbol and an average of ZF values in the remaining combinations into a power value, as the estimation value $\sigma_X^2$.

$$\sigma_X^2 = \frac{1}{N_{rx}\min(N_{tx},2)(N_{sc}/\Delta f - 1)}\sum_{i=0}^{N_{rx}-1}\sum_{j=0}^{\min(N_{tx},2)-1}\sum_{n=0}^{N_{sc}/\Delta f-1} \left| \frac{h_{ij}^{(ZF)}(0, n\Delta f + \text{shift}_0(j)) + h_{ij}^{(ZF)}(4,(n+1)\Delta f + \text{shift}_1(j))}{2} - \frac{h_{ij}^{(ZF)}(0,(n+1)\Delta f + \text{shift}_0(j)) + h_{ij}^{(ZF)}(4, n\Delta f + \text{shift}_1(j))}{2} \right|^2 \quad (3)$$

By calculating the above-described estimation value $\sigma_X^2$, an impact on the estimation value $\sigma_X^2$ by frequency selective fading is reduced. The third estimation unit 42 may use a ZF value of a CRS that is allocated to the seventh or the eleventh OFDM symbol, instead of the ZF value of the CRS that is allocated to the fourth OFDM symbol.

The determination unit 43 determines whether a ratio $\sigma_{est1}^2/\sigma_{est2}^2$ of the estimation value $\sigma_{est1}^2$ to the estimation value $\sigma_{est2}^2$ is larger than or equal to a specific threshold value $\alpha$. When the ratio $\sigma_{est1}^2/\sigma_{est2}^2$ is larger than or equal to the threshold value $\alpha$, it is indicated that a difference between the interference noise power in the leading OFDM symbol and the interference noise power in the OFDM symbol that includes a CRS and is not the leading OFDM symbol is large. Such a state occurs when the macro cell 6 that is the dominant macro cell transmits an MBSFN ABS, and a CRS of the dominant macro cell 6 and a CRS of the pico cell 5 are collided with each other on the frequency axis.

In this case, as illustrated in FIG. 5C, values of the interference noise power between the leading OFDM symbol and the OFDM symbol that includes a CRS and is not the leading OFDM symbol are different. Therefore, the determination unit 43 selects the estimation value $\sigma_{est1}^2$ as the interference noise power estimation value $M_{OC2,est1}$ of the leading OFDM symbol. The determination unit 43 selects the estimation value $\sigma_{est2}^2$ as the interference noise power estimation value $M_{OC2,est2}$ in the OFDM symbol that includes a CRS and is not the leading OFDM symbol.

In addition, a state in which the ratio $\sigma_{est1}^2/\sigma_{est2}^2$ is less than the threshold value $\alpha$ occurs when the dominant macro cell 6 transmits a Non-MBSFN ABS, and a CRS of the dominant macro cell 6 and a CRS of the pico cell 5 are not collided with each other on the frequency axis. In this case, as illustrated in FIG. 4C, a difference between the interference noise power in the leading OFDM symbol and the interference noise power in the OFDM symbol that includes a CRS and is not the leading OFDM symbol is small. The determination unit 43 selects the estimation value $\sigma_X^2$ as the interference noise power estimation values $M_{OC2,est1}$ and $M_{OC2,est2}$.

The determination unit 43 inputs the interference noise power estimation values $M_{OC2,est1}$ and $M_{OC2,est2}$ to the channel estimation unit 35 and the demodulation unit 37.

Referring to FIG. 8, the channel estimation unit 35 executes estimation processing of a channel using the ZF value and the interference noise power estimation values $M_{OC2,est1}$ and $M_{OC2,est2}$. For example, the channel estimation unit 35 calculates a channel estimation value by a two-dimensional linear minimum mean squared error (LMMSE) channel estimation method.

When the channel estimation unit 35 executes closed channel estimation within one subframe and one resource block, a channel estimation value "$h_{ij}'^\wedge$" in a radio resource that is a target of the channel estimation between the j-th transmission antenna and the i-th reception antenna is calculated, for example, in accordance with the following formulas (4) and (5).

$$h_{ij}'^\wedge = W^\wedge h_{ij}(ZF)^\wedge \quad (4)$$

$$W^\wedge = \langle h_{ij}'^\wedge h_{ij}^{\wedge H}\rangle\langle\langle h_{ij}^\wedge h_{ij}^{\wedge H}\rangle + \text{diag}\left[\frac{M_{OC2,est1}}{\langle|x|^2\rangle}, \frac{M_{OC2,est1}}{\langle|x|^2\rangle}, \frac{M_{OC2,est2}}{\langle|x|^2\rangle}, \frac{M_{OC2,est2}}{\langle|x|^2\rangle}, \frac{M_{OC2,est2}}{\langle|x|^2\rangle}, \frac{M_{OC2,est2}}{\langle|x|^2\rangle}, \frac{M_{OC2,est2}}{\langle|x|^2\rangle}, \frac{M_{OC2,est2}}{\langle|x|^2\rangle}\right]\rangle \quad (5)$$

Here, "$h_{ij}'^\wedge$" represents a channel estimation value in a radio resource that is a target of the channel estimation between the j-th transmission antenna and the i-th reception antenna, by a vector. In addition "$h_{ij}^\wedge$" represents a channel in a radio resource to which a CRS is transmitted, by a vector. In addition, "$h_{ij}^\wedge H$" is hermitian conjugate of the vector "$h_{ij}^\wedge$". In addition, "$h_{ij}^{(ZF)\wedge}$" represents a ZF value in the radio resource to which a CRS is transmitted, by a vector, and is obtained in accordance with the following formula (6). In addition, "$|x|2$" represents power of the original CRS pattern, and "$\langle\;\rangle$" represents an ensemble average.

$$h_{ij}^{(ZF)\wedge} = \begin{bmatrix} h_{ij}^{(ZF)}(0,5) \\ h_{ij}^{(ZF)}(0,11) \\ h_{ij}^{(ZF)}(4,2) \\ h_{ij}^{(ZF)}(4,8) \\ h_{ij}^{(ZF)}(7,5) \\ h_{ij}^{(ZF)}(7,11) \\ h_{ij}^{(ZF)}(11,2) \\ h_{ij}^{(ZF)}(11,8) \end{bmatrix} \quad (6)$$

The channel estimation unit 35 calculates a weighting matrix "W^" in accordance with the above-described formula (5), on the basis of values $<h_{ij}'^{\wedge} h_{ij}^{\wedge H}>$ and $<h_{ij}^{\wedge} h_{ij}^{\wedge H}>$ that are calculated from a doppler frequency and delay spread. The channel estimation unit 35 calculates a channel estimation value "$h_{ij}'^{\wedge}$" by multiplying the ZF value "$h_{ij}^{(ZF)\wedge}$" by the weighting matrix "W^".

As described above, the channel estimation method using eight CRSs is described, but the channel estimation unit 35 may perform the channel estimation method using CRSs the number of which is not eight. The channel estimation unit 35 may also perform the channel estimation using an interference noise power estimation value in accordance with another channel estimation method other than the two-dimensional LMMSE.

The second interference noise power estimation unit 36 calculates an interference noise power estimation value $M_{OC1,est}$ in an OFDM symbol that does not include a CRS in accordance with the following formula (7), on the basis of a received signal of a data portion other than a CRS portion and a channel estimation value of the data portion, and inputs the interference noise power estimation value $M_{OC1,est}$ to the demodulation unit 37.

$$M_{OC1,est} = <(<\hat{y}\hat{y}^H> - \hat{H}\hat{H}^H)_{i,i}> \tag{7}$$

In the above-described formula (7), "y^" represents a received signal of an OFDM symbol that does not include a CRS. In addition, "H^" represents a channel estimation value in a representative point of an average interval of "$\hat{y}\hat{y}^H$". In addition, the subscript "i,i" represents the i-th diagonal component. In addition, "$H^{\wedge H}$" represents hermitian conjugate of "matrix H^".

The Mathematical Expression formula within the above-described formula parentheses "( )" becomes a matrix when the mobile station 3 includes a plurality of reception antennas, but a non-diagonal component may not be calculated. Therefore, the calculation of the formula (7) may be performed in accordance with the following formula (8).

$$M_{OC1,est} = \frac{1}{N_{rx}} \sum_{i=0}^{i=N_{rx}-1} \left( \langle |y_i|^2 \rangle - \sum_{j=0}^{j=N_{tx}-1} |h_{i,j}|^2 \right) \tag{8}$$

Here, "$y_i$" represents a received signal of an OFDM symbol that does not include a CRS in the i-th reception antenna of the mobile station. In addition, "$h_{ij}$" represents a channel estimation value between the j-th transmission antenna of the base station and the i-th reception antenna of the mobile station at a representative point of an average interval of "$|y_i|2$", "$N_{rx}$" represents the number of reception antennas of the mobile station, and "$N_{tx}$" represents the number of transmission antennas of the base station.

For example, an example in which OFDM symbols of "t=1, 2, and 3" are used is represented by the following formula (9).

$$M_{OC1,est} = \frac{1}{N_{rx}} \sum_{i=0}^{N_{rx}-1} \left( \frac{1}{\lceil N_{sc}/f_{ave} \rceil} \right.$$

$$\sum_{s=0}^{\lceil N_{sc}/f_{ave}\rceil-1} \left( \frac{1}{f_{ave}T_{ave}} \sum_{f=0}^{f_{ave}-1} \sum_{t=0}^{T_{ave}-1} |y_i(t+1, f+sf_{ave})|^2 - \right.$$

$$\left. \left. \sum_{j=0}^{N_{tx}-1} |h_{i,j}(1, f+sf_{ave}+1)|^2 \right) \right)$$

Figure 11:
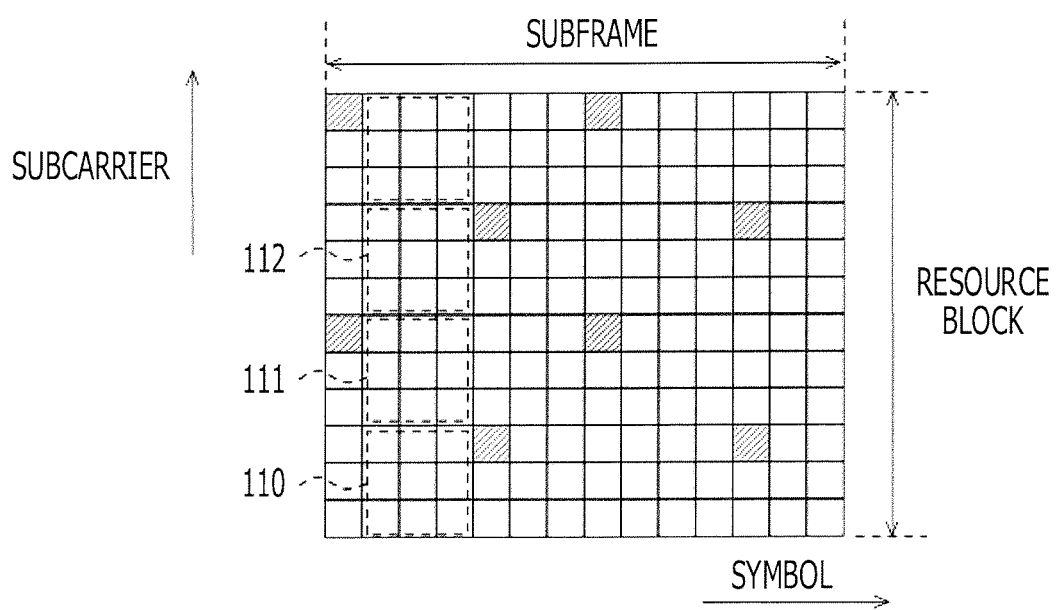
FIG. 11 is a diagram illustrating a first example of average intervals of received signals of OFDM symbols.

Here, "$T_{ave}$" and "$f_{ave}$" respectively represent average interval lengths in a time axis and a frequency axis, and "$N_{sc}$" represents the number of subcarriers. FIG. 11 is a diagram illustrating a first example of average intervals of received signals of OFDM symbols in cases of "$T_{ave}=3$" and "$f_{ave}=3$".

The dashed line area indicates a range of radio resources of the average interval. This is also applied in FIGS. 12A to 14B.

In average intervals 110, 111, 112 . . . , interference noise power estimation values $M_{OC1,est}$ that are used for demodulation of radio resources in such intervals are respectively calculated with reference to the following formulas (10), (11), and (12).

$$\frac{1}{9} \sum_{f=0}^{2} \sum_{t=0}^{2} |y_i(t+1, f+0)|^2 - \sum_{j=0}^{N_{tx}-1} |h_{i,j}(2, 1)|^2 \tag{10}$$

$$\frac{1}{9} \sum_{f=0}^{2} \sum_{t=0}^{2} |y_i(t+1, f+3)|^2 - \sum_{j=0}^{N_{tx}-1} |h_{i,j}(2, 4)|^2 \tag{11}$$

$$\frac{1}{9} \sum_{f=0}^{2} \sum_{t=0}^{2} |y_i(t+1, f+6)|^2 - \sum_{j=0}^{N_{tx}-1} |h_{i,j}(2, 7)|^2 \tag{12}$$

It is desirable that a representative point of an average interval is a radio resource at the center of the average interval. There is case in which one radio resource at the center of the average interval may not be decided depending on selection of an average interval, and in this case, a radio resource near the center may be selected arbitrary.

Figure 12A:
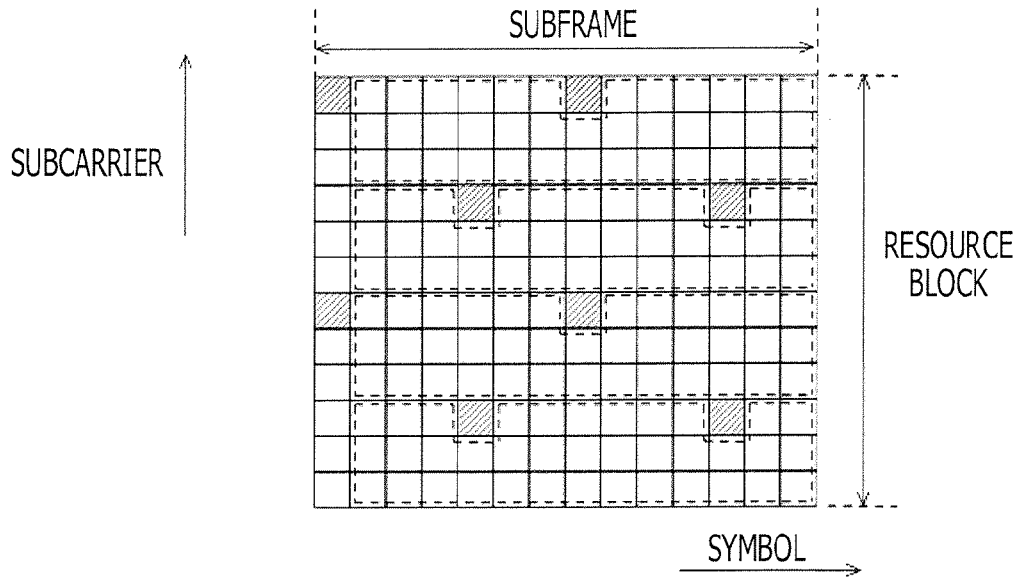
FIGS. 12A and 12B are diagrams illustrating a second example and a third example of the average intervals.
Figure 12B:
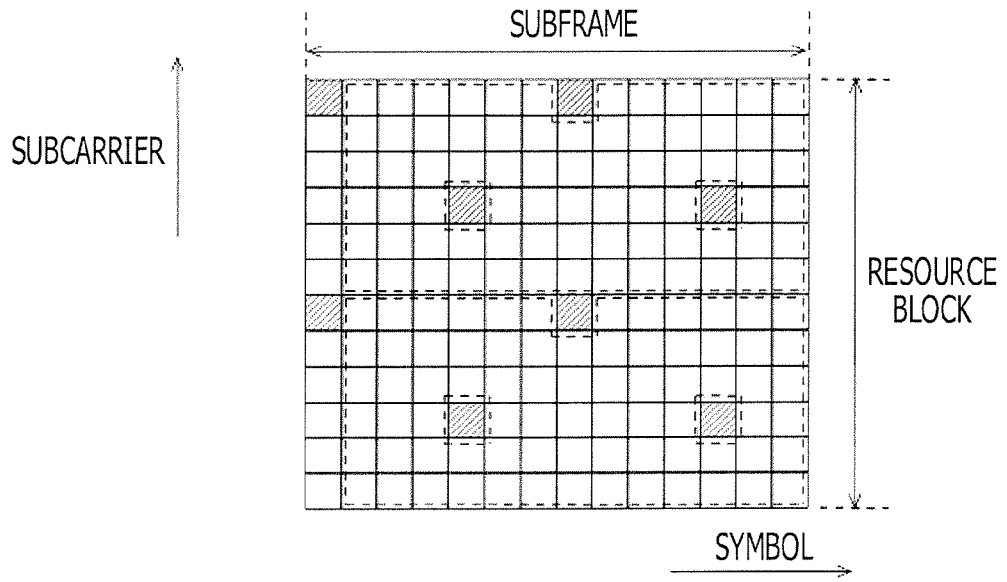

FIGS. 12A and 12B are diagrams illustrating a second example and a third example of the average intervals. As illustrated in FIG. 12A, average intervals may cover all OFDM symbols that do not include a CRS in a subframe. By expanding average intervals, improvement of measurement accuracy of the interference noise power estimation value $M_{OC1,est}$ is expected. As illustrated in FIG. 12B, the second interference noise power estimation unit 36 may set average intervals so that "$f_{ave}$" is larger than "$T_{ave}$" and the average intervals in the frequency direction are increased. In this case, improvement of accuracy is expected in an environment in which frequency selectivity is not severe.

Figure 13A:
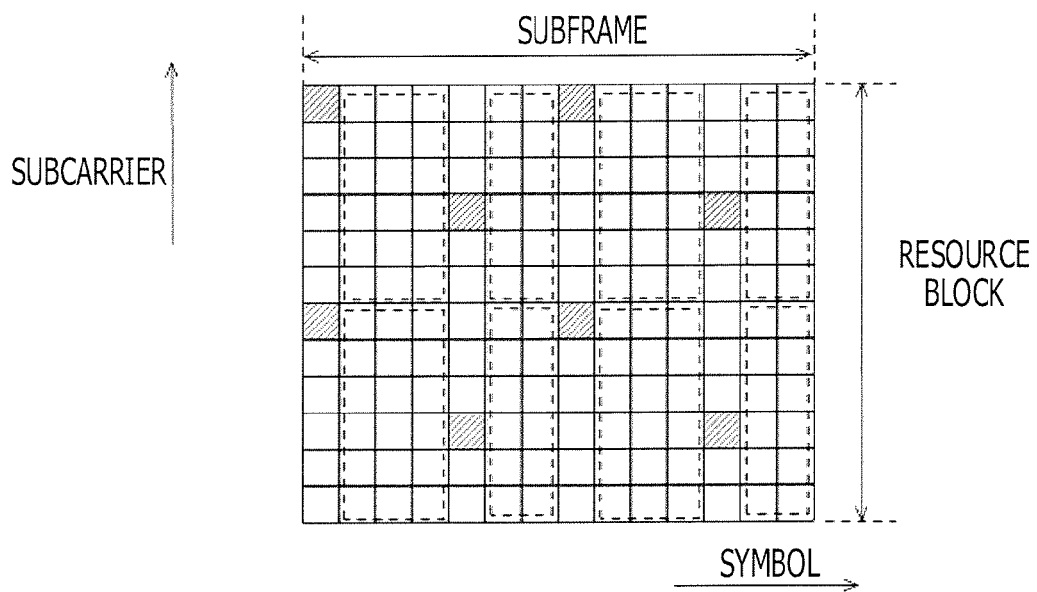
FIGS. 13A and 13B are diagram illustrating a fourth example and a fifth example of the average intervals.
Figure 13B:
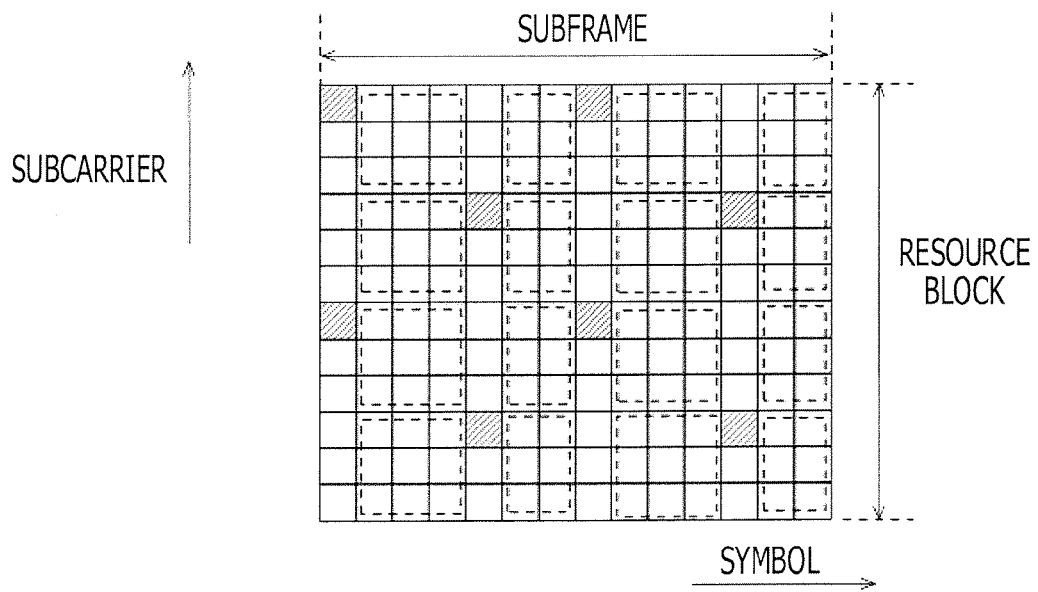

FIGS. 13A and 13B are diagram illustrating a fourth example and a fifth example of the average intervals. When the doppler frequency is large, the second interference noise power estimation unit 36 may set average intervals so that average interval lengths in the time direction are reduced as illustrated in FIG. 13A. When the frequency selectivity is severe, the second interference noise power estimation unit 36 may set the average intervals so that the average interval lengths in the frequency direction are reduced. When the doppler frequency is large and the frequency selectivity is severe, the second interference noise power estimation unit 36 may set average intervals so that the average interval lengths in both of the time direction and the frequency direction are reduced, as illustrated in FIG. 13B.

Figure 14A:
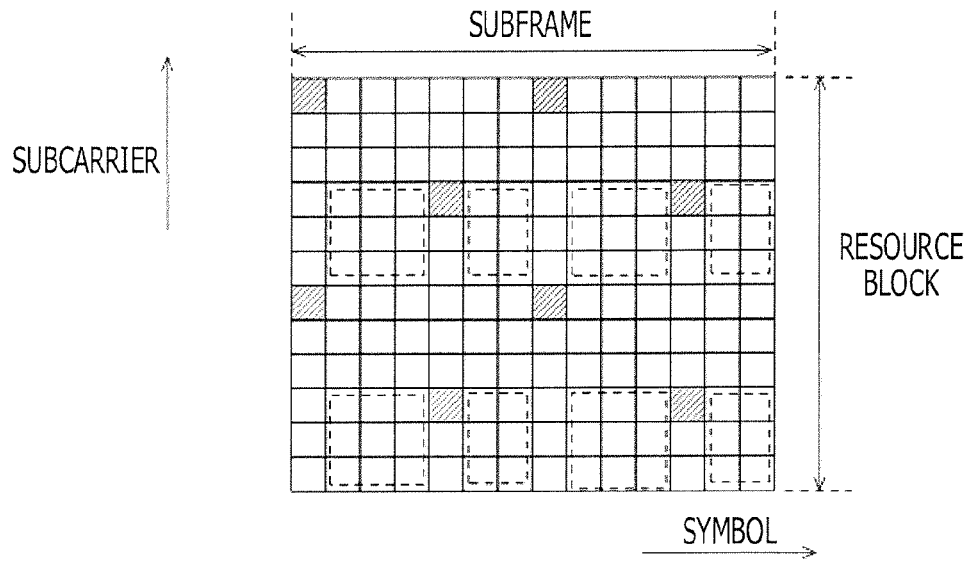
FIGS. 14A and 14B are diagram illustrating a sixth example and a seventh example of the average intervals.
Figure 14B:
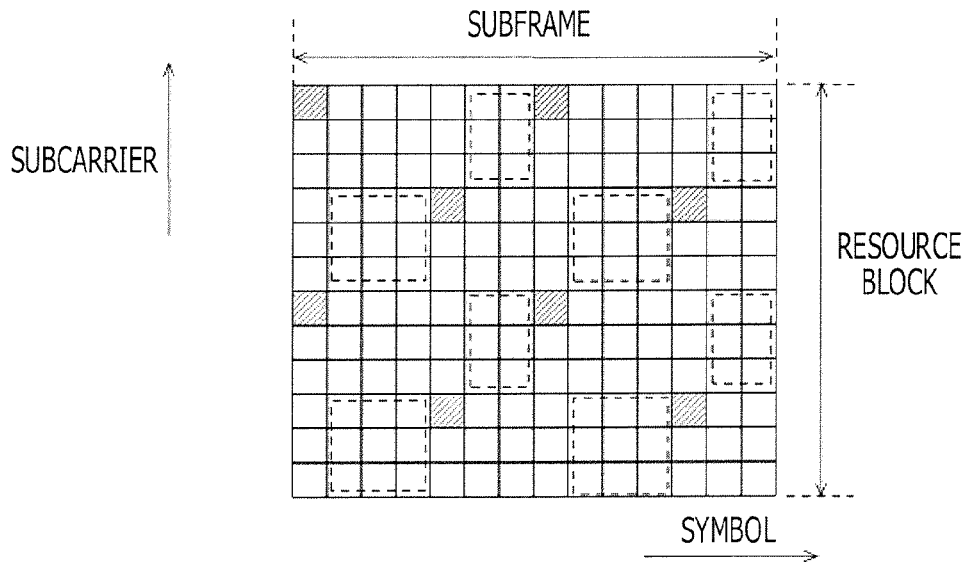

FIGS. 14A and 14B are diagram illustrating a sixth example and a seventh example of the average intervals. As illustrated in FIGS. 14A and B, the second interference noise power estimation unit 36 may reduce a calculation amount by reducing the range of an average interval.

When the ratio $\sigma_{est1}^2/\sigma_{est2}^2$ is larger than or equal to the specific threshold value α, the second interference noise power estimation unit 36 may select the $\sigma_{est2}^2$ as the interference noise power estimation value $M_{OC1,est}$. The second interference noise power estimation unit 36 may calculate the interference noise power estimation value $M_{OC1,est}$ in accordance with the above-described formula (7) merely when the ratio $\sigma_{est1}^2/\sigma_{est2}^2$ is less than the specific threshold value α.

Referring to FIG. 8, the demodulation unit 37 executes demodulation processing using the channel estimation value "H^" in a radio resource of a target to be demodulated, the received signal "y^" of the data portion, and the interference noise power estimation values $M_{OC1,est}$, $M_{OC2,est1}$ and $M_{OC2,est2}$. The demodulation processing by the demodulation unit 37 may be, for example, minimum mean square error (MMSE) demodulation processing of multiple-input and multiple-output (MIMO), which is described below.

The demodulation unit 37 calculates a signal z^ after demodulation for the data portion of the leading OFDM symbol (t=0) in accordance with the following formula (13). Here "y^" represents a received signal that is a demodulation target, by a vector, and "z^" represents a signal after demodulation by a vector. In addition, "I^" indicate a unit matrix.

$$z^{\wedge}=H^{\wedge H}(H^{\wedge}H^{\wedge H}+M_{OC2,est2}I^{\wedge})^{-1}y^{\wedge} \quad (13)$$

A value $M_{OC2,est1}$ is not used for the formula (13) because it is conceivable that interference noise power of a data portion when the dominant macro cell 6 transmits a MBSFN ABS and the CRSs are collided with each other is a value $M_{OC2,est2}$. In addition, this is also why the mobile station may not know in which subcarrier the dominant macro cell transmit the CRS, and a possibility that the interference noise power is the value $M_{OC2,est2}$ is higher than a possibility that the interference noise power is the value $M_{OC2,est1}$ when the dominant macro cell 6 transmits a Non-MBSFN ABS and the CRSs are not collided with each other.

The demodulation unit 37 calculates a signal z^ after demodulation for data portions of the OFDM symbols (t=4, 7, and 11) each of which includes a CRS and is not the leading OFDM symbol, in accordance with the following formula (14).

$$z^{\wedge}=H^{\wedge H}(H^{\wedge}H^{\wedge H}+M_{OC2,est2}I^{\wedge})^{-1}y^{\wedge} \quad (14)$$

The demodulation unit 37 calculates a signal z^ after demodulation for data portions of the OFDM symbols (t=1, 2, 3, 5, 6, 8, 9, 10, 12, and 13) each of which does not include a CRS, in accordance with the following formula (15).

$$z^{\wedge}=H^{\wedge H}(H^{\wedge}H^{\wedge H}+M_{OC1,est}I^{\wedge})^{-1}y^{\wedge} \quad (15)$$

The demodulation unit 37 calculates a log likelihood ratio (LLR) from the demodulation signal and inputs the demodulation signal and the LLR to the error correction decoding unit 26.

A function of each of the configuration elements when the reception target subframe is not an ABS is described below. In this case, the second interference noise power estimation unit 36 does not calculate the interference noise power estimation value $M_{OC1,est}$. The determination unit 43 of the first interference noise power estimation unit 34 outputs the output result of the third estimation unit 42 to the demodulation unit 37 as an interference noise power estimation value $M_{OC3,est}$.

The demodulation unit 37 calculates a signal z^ after demodulation for data portions of all of the OFDM symbols in accordance with the following formula (16).

$$z^{\wedge}=H^{\wedge H}(H^{\wedge}H^{\wedge H}+M_{OC3,est}I^{\wedge})^{-1}y^{\wedge} \quad (16)$$

2.2. Operation in the First Embodiment

Figure 15:
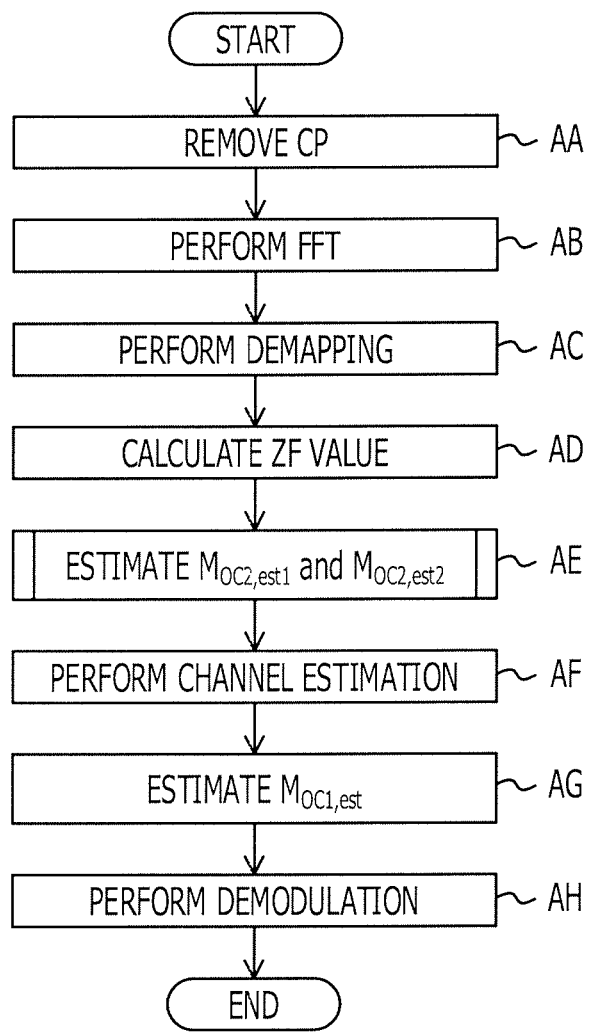
FIG. 15 is a diagram illustrating an example of an operation of the mobile station device when a reception target subframe is an ABS.

An operation of the mobile station 3 when the reception target subframe is an ABS is described below. FIG. 15 is a diagram illustrating an example of an operation of the mobile station 3 when the reception target subframe is an ABS.

In Operation AA, the CP removal unit 30 removes a CP from a received signal. In Operation AB, the FFT unit 31 transforms the received signal from which the CP is removed into a signal in a frequency domain by the FFT processing. In Operation AC, the demapping unit 32 extracts a received signal of a data portion and a received signal of a CRS portion from the signal of the frequency domain, and inputs the received signal of the data portion to the demodulation unit 37 and the second interference noise power estimation unit 36. The demapping unit 32 inputs the received signal of the CRS portion to the ZF calculation unit 33.

In Operation AD, the ZF calculation unit 33 calculates a ZF value of the received signal of the CRS portion, and inputs the ZF value to the first interference noise power estimation unit 34. In Operation AE, the first interference noise power estimation unit 34 estimates interference noise power estimation values $M_{OC2,est1}$ and $M_{OC2,est2}$.

Figure 16:
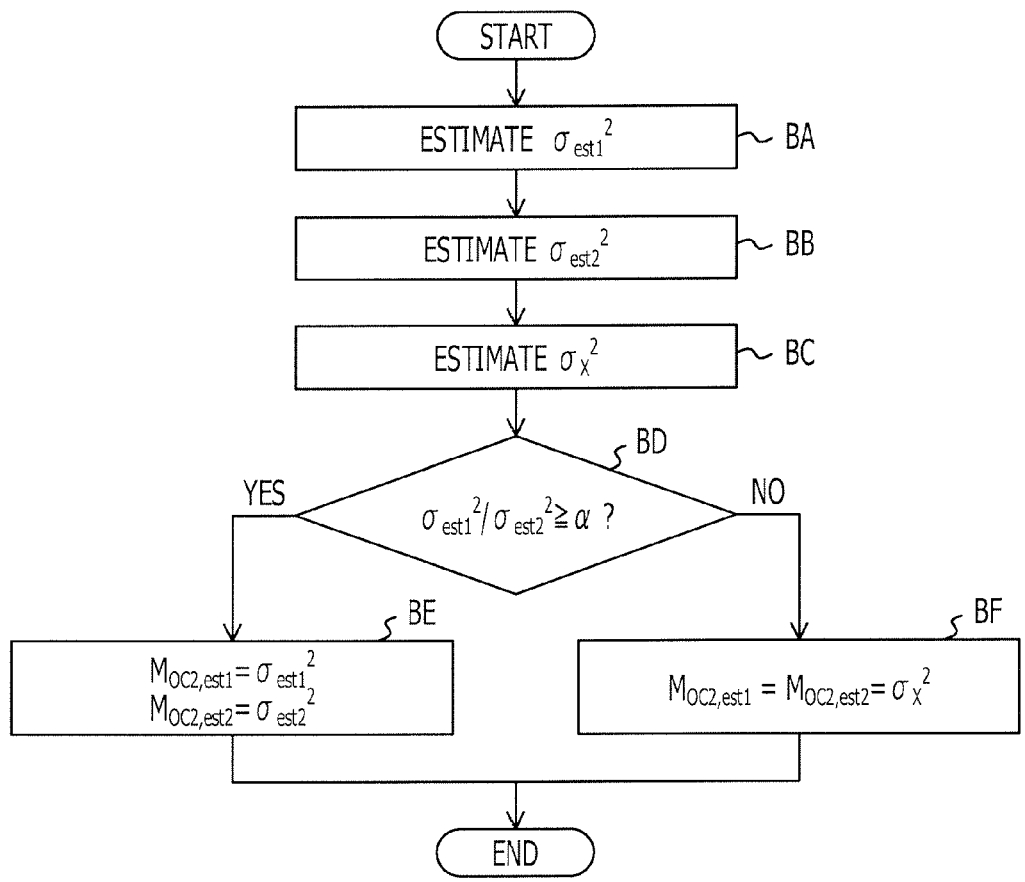
FIG. 16 is a diagram illustrating a first example of an estimation operation of interference noise power estimation values $M_{OC2,est1}$ and $M_{OC2,est2}$.

FIG. 16 is a diagram illustrating a first example of an estimation operation of interference noise power estimation values $M_{OC2,est1}$ and $M_{OC2,est2}$. In Operation BA, the first estimation unit 40 calculates an estimation value $\sigma_{est1}^2$ of interference noise power in the leading OFDM symbol. In Operation BB, the second estimation unit 41 calculates an estimation value $\sigma_{est2}^2$ of interference noise power in an OFDM symbol that includes a CRS and is not the OFDM symbol.

In Operation BC, the third estimation unit 42 calculates a common estimation value $\sigma_X^2$ of interference noise power in the leading OFDM symbol and the fourth OFDM symbol. In Operation BD, the determination unit 43 determines whether a ratio $\sigma_{est1}^2/\sigma_{est2}^2$ is larger than or equal to a threshold value α.

When the ratio $\sigma_{est1}^2/\sigma_{est2}^2$ is larger than or equal to the threshold value α (Yes in Operation BD), the processing proceeds to Operation BE. When the ratio $\sigma_{est1}^2/\sigma_{est2}^2$ is less than the threshold value α (No in Operation BD), the processing proceeds to Operation BF.

In Operation BE, the determination unit 43 selects the estimation value $\sigma_{est1}^2$ as the interference noise power estimation value $M_{OC2,est1}$ in the leading OFDM symbol. The determination unit 43 selects the estimation value $\sigma_{est2}^2$ as the interference noise power estimation value $M_{OC2,est2}$ in the OFDM symbol that includes a CRS and is not the leading OFDM symbol. The determination unit 43 inputs the interference noise power estimation values $M_{OC2,est1}$ and $M_{OC2,est2}$ to the channel estimation unit 35 and the demodulation unit 37. After that, the processing proceeds to Operation AF in FIG. 15.

In Operation BF, the determination unit 43 selects the estimation value $\sigma_X^2$ as the interference noise power estimation values $M_{OC2,est1}$ and $M_{OC2,est2}$. The determination unit 43 inputs the interference noise power estimation values $M_{OC2,est1}$ and $M_{OC2,est2}$ to the channel estimation unit 35 and the demodulation unit 37. After that, the processing proceeds to Operation AF in FIG. 15.

Referring to FIG. 15, in Operation AF, the channel estimation unit 35 executes the estimation processing of a channel. In Operation AG, the second interference noise power estimation unit 36 calculates an interference noise power estimation value $M_{OC1,est}$ in the OFDM symbol that does not include a CRS, and inputs the interference noise power estimation value $M_{OC1,est}$ to the demodulation unit 37. In Operation AH, the demodulation unit 37 executes the demodulation processing using a channel estimation value in a resource that is a demodulation target, a received signal of a data portion, the interference noise power estimation values $M_{OC1,est}$, $M_{OC2,est1}$, and $M_{OC2,est2}$.

2.3. Effect of the Embodiment

In the embodiment, in a radio frame that includes a reference signal and does not include data, different interference noise power may be calculated depending on an OFDM symbol. Therefore, even when interference noise power is changed depending on an OFDM symbol in the radio frame, the channel estimation processing or the demodulation processing may be executed for each different interference noise power. As a result, an error in the channel estimation processing or the demodulation processing is reduced.

3. Second Embodiment

Figure 17:
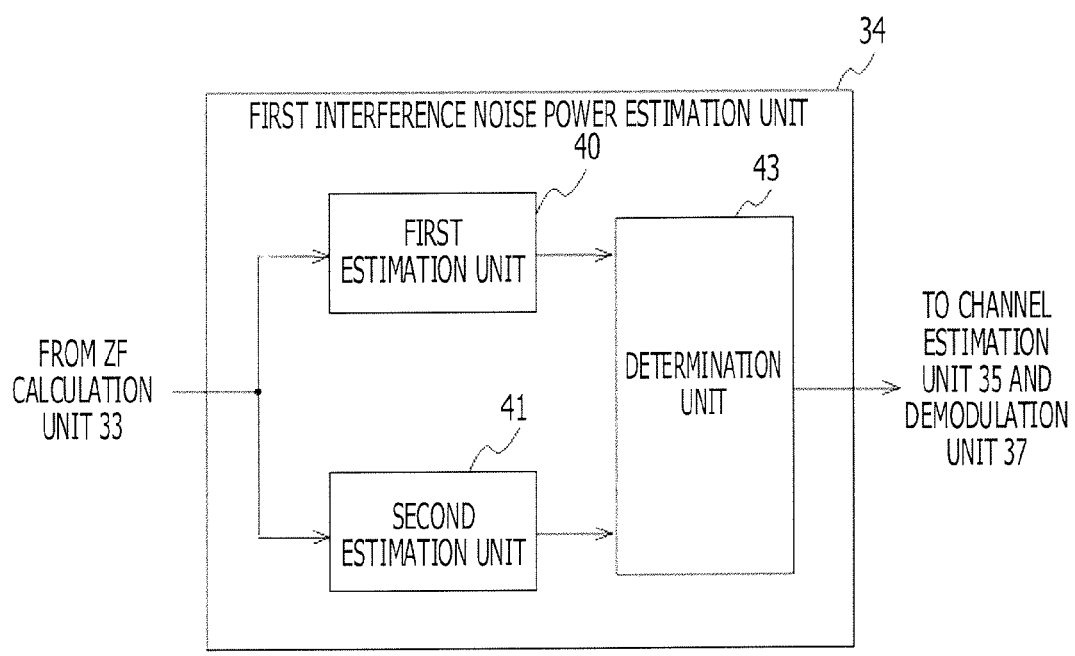
FIG. 17 is a functional block diagram illustrating a second example of the first interference noise power estimation unit.

FIG. 17 is a functional block diagram illustrating a second example of the first interference noise power estimation unit 34. To configuration elements illustrated in FIG. 17 that are similar to the configuration elements illustrated in FIG. 9, the same reference numerals as FIG. 9 are assigned, and the description of the similar function is omitted herein. The first estimation unit 40 calculates an estimation value $\sigma_{est1}^2$ of interference noise power in the leading OFDM symbol using a CRS in the leading OFDM symbol.

The second estimation unit 41 calculates an estimation value $\sigma_{est3}^2$ of interference noise power in the OFDM symbol that includes a CRS and is not the leading OFDM symbol using CRSs in all or a part of the fourth, seventh, and eleventh OFDM symbols. The second estimation unit 41 may not use the CRSs in all or a part of the fourth, seventh, and eleventh OFDM symbols. For example, the second estimation unit 41 may use merely the CRSs in the fourth OFDM symbol.

In addition, for example, the second estimation unit 41 may calculate an average of values each of which is obtained by converting a difference between an average of ZF values of a combination in which the frequencies are the farthest, out of combinations of CRSs in the fourth and seventh OFDM symbols and an average of ZF values of the remaining combinations into a power value, as the estimation value $\sigma_{est3}^2$. For example, the second estimation unit 41 may calculate an average of values each of which is obtained by converting a difference between an average of ZF values of a combination in which the frequencies are the farthest, out of combinations of CRSs in the seventh and eleventh OFDM symbols and an average of ZF values of the remaining combinations into a power value, as the estimation value $\sigma_{est3}^2$. In addition, for example, the second estimation unit 41 may calculate the estimation value $\sigma_{est3}^2$ by further averaging the calculated estimation values.

The determination unit 43 determines whether a ratio $\sigma_{est1}^2/\sigma_{est3}^2$ of the estimation value $\sigma_{est1}^2$ to the estimation value $\sigma_{est3}^2$ is larger than or equal to a specific threshold value α. When the ratio $\sigma_{est1}^2/\sigma_{est3}^2$ is larger than or equal to the threshold value α, the determination unit 43 selects the estimation value $\sigma_{est1}^2$ as the interference noise power estimation value $M_{OC2,est1}$ in the leading OFDM symbol. The determination unit 43 selects the estimation value $\sigma_{est3}^2$ as the interference noise power estimation value $M_{OC2,est2}$ in the OFDM symbol that includes a CRS and is not the leading OFDM symbol.

When the ratio $\sigma_{est1}^2/\sigma_{est3}^2$ is less than the threshold value α, the determination unit 43 selects the estimation value $\sigma_{est3}^2$ as the interference noise power estimation values $M_{OC2,est1}$ and $M_{OC2,est2}$. Alternatively, the determination unit 43 may select the estimation value $\sigma_{est1}^2$ as the interference noise power estimation values $M_{OC2,est1}$ and $M_{OC2,est2}$.

The determination unit 43 may select a weighting average value "$(m_1\sigma_{est1}^2+m_2\sigma_{est3}^2)/(m_1+m_2)$" of the ratio "$\sigma_{est1}^2/\sigma_{est3}^2$" as the interference noise power estimation values $M_{OC2,est1}$ and $M_{OC2,est2}$. The coefficients $m_1$ and $m_2$ may be defined depending on the number of CRSs that are used for the estimation. As an example, when the leading OFDM symbol is used for the estimation of the value $\sigma_{est1}^2$, and the fourth, seventh, and eleventh OFDM symbols are used for the estimation of the value $\sigma_{est3}^2$, "$m_1=1$" and "$m_2=3$" may be used, or "$m_1=1$" and "$m_2=9$" may be used.

Figure 18:
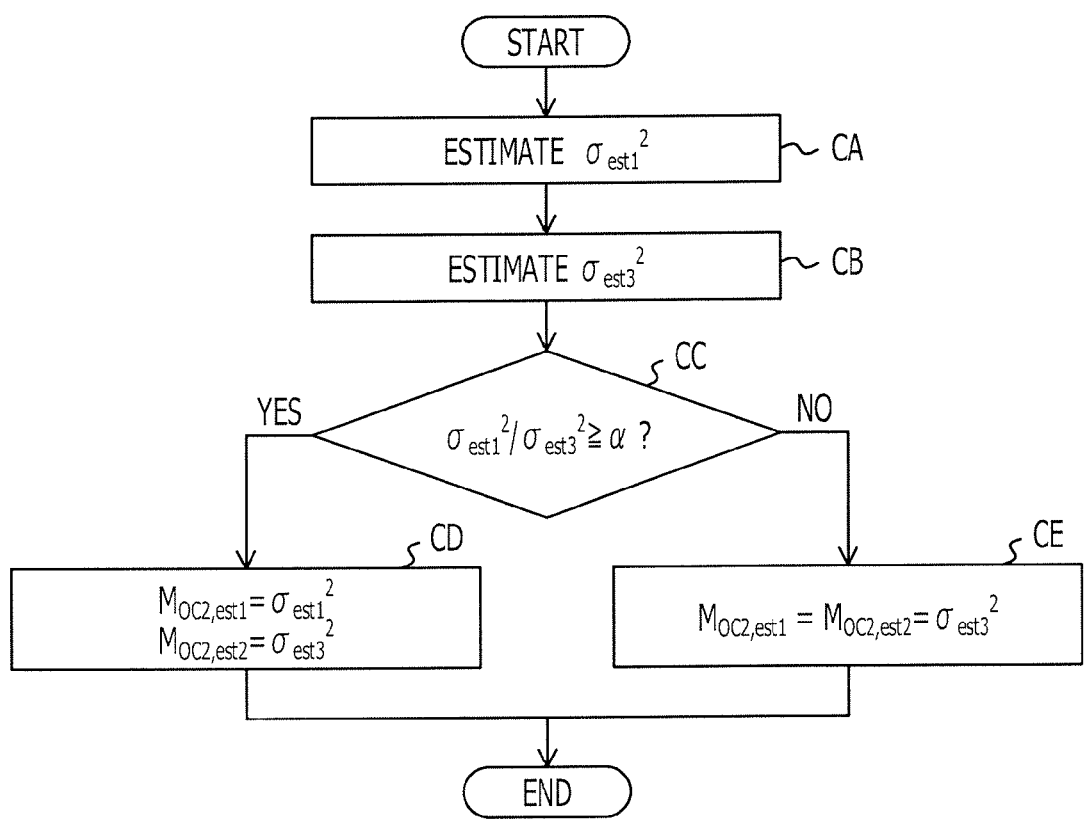
FIG. 18 is a diagram illustrating a second example of the estimation operation of the interference noise power estimation values $M_{OC2,est1}$ and $M_{OC2,est2}$.

FIG. 18 is a diagram illustrating a second example of the estimation operation of interference noise power estimation values $M_{OC2,est1}$ and $M_{OC2,est2}$. In Operation CA, the first estimation unit 40 calculates an estimation value $\sigma_{est1}^2$ of interference noise power in the leading OFDM symbol. In Operation CB, $\sigma_{est1}^2$ the second estimation unit 41 calculates an estimation value $\sigma_{est3}^2$ of interference noise power in the OFDM symbol that includes a CRS and is not the leading OFDM symbol.

In Operation CC, the determination unit 43 determines whether a ratio $\sigma_{est1}^2/\sigma_{est3}^2$ is larger than or equal to a threshold value α. When the ratio $\sigma_{est1}^2/\sigma_{est3}^2$ is larger than or equal to the threshold value α (Yes in Operation CC), the processing proceeds to Operation CD. When the ratio $\sigma_{est1}^2/\sigma_{est3}^2$ is less than the threshold value α (No in Operation CC), the processing proceeds to Operation CE.

In Operation CD, the determination unit 43 selects the estimation value $\sigma_{est1}^2$ as the interference noise power estimation value $M_{OC2,est1}$ in the leading OFDM symbol. The determination unit 43 selects the estimation value $\sigma_{est3}^2$ as the interference noise power estimation value $M_{OC2,est2}$ in the OFDM symbol that includes a CRS and is not the leading OFDM symbol. The determination unit 43 inputs the interference noise power estimation values $M_{OC2,est1}$ and $M_{OC2,est2}$ to the channel estimation unit 35 and the demodulation unit 37. After that, the processing proceeds to Operation AF in FIG. 15.

In Operation CE, the determination unit 43 selects the estimation value $\sigma_{est3}^2$ as the interference noise power estimation values $M_{OC2,est1}$ and $M_{OC2,est2}$. The determination unit 43 inputs the interference noise power estimation values $M_{OC2,est1}$ and $M_{OC2,est2}$ to the channel estimation unit 35 and the demodulation unit 37. After that, the processing proceeds to Operation AF in FIG. 15.

In the second embodiment, the calculation of the estimation value $\sigma_{est2}^2$ and the calculation of the estimation value $\sigma_x^2$ in the first embodiment may have commonality. Therefore, the calculation processing by the first interference noise power estimation unit 34 may be reduced. In addition, the circuit scale of the first interference noise power estimation unit 34 may be reduced.

4. Third Embodiment

Figure 19:
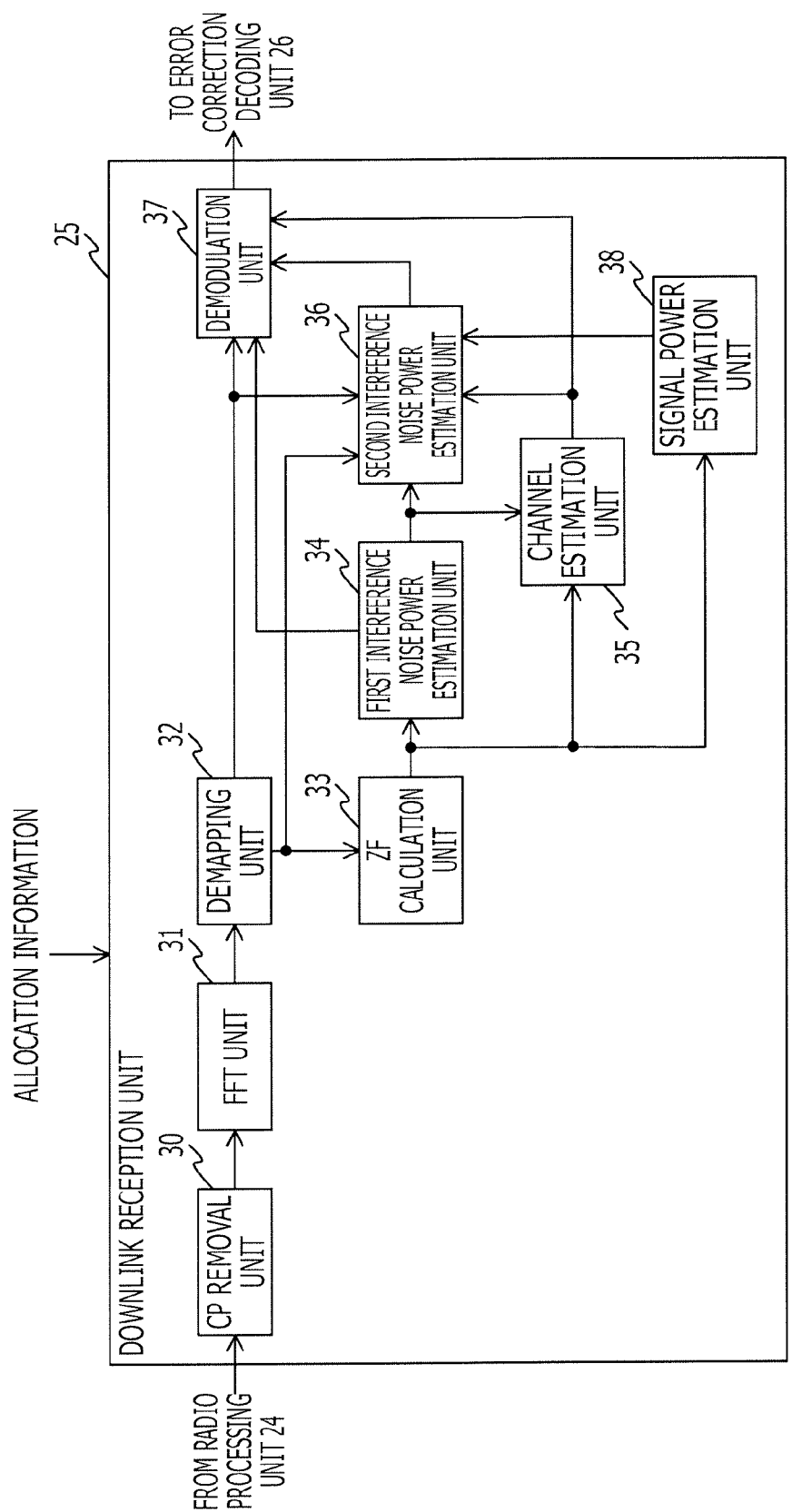
FIG. 19 is a functional block diagram illustrating a second example of the downlink reception unit.

FIG. 19 is a functional block diagram illustrating a second example of the downlink reception unit 25. To configuration elements in FIG. 19 that are similar to the configuration elements in FIG. 8, the same reference numerals as FIG. 8 are assigned, and the description of the similar function is omitted herein. The downlink reception unit 25 includes a signal power estimation unit 38.

The signal power estimation unit 38 calculates a signal power estimation value S on the basis of a ZF value that is output from the ZF calculation unit 33. The signal power estimation unit 38 inputs the signal power estimation value S to the second interference noise power estimation unit 36. The first interference noise power estimation unit 34 inputs the interference noise power estimation values $M_{OC2,est1}$ and $M_{OC2,est2}$ to the second interference noise power estimation unit 36. The demapping unit 32 inputs a received signal $y_t$ to the second interference noise power estimation unit 36.

Figure 20:
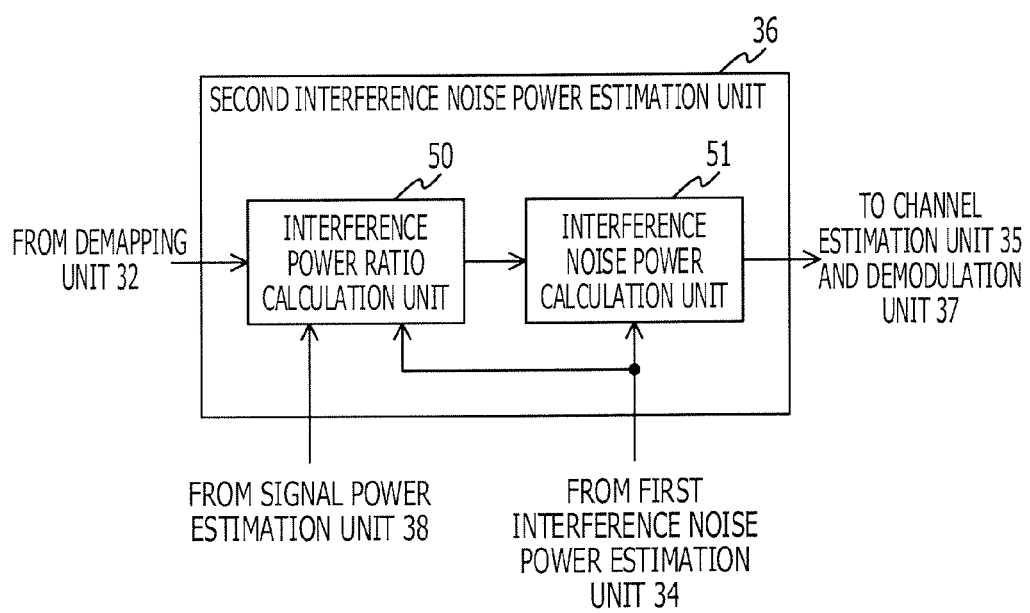
FIG. 20 is a functional block diagram illustrating an example of a second interference noise power estimation unit.

FIG. 20 is a functional block diagram illustrating an example of the second interference noise power estimation unit 36. The second interference noise power estimation unit 36 includes an interference power ratio calculation unit 50 and an interference noise power calculation unit 51. The interference power ratio calculation unit 50 calculates decibel representation Y of a ratio of the interference noise power in the OFDM symbol that does not include a CRS to the interference noise power in the OFDM symbol that includes a CRS, in accordance with the following formula (17).

$$Y = 10\log_{10}\left\{ \frac{\left(\frac{1}{N_x}\sum_{i=0}^{N_{rx}-1}\langle|y_i|^2\rangle_{OFDM\ symbol\ that\ includes\ a\ CRS} - S\right)}{\left(\frac{1}{N_x}\sum_{i=0}^{N_{rx}-1}\langle|y_i|^2\rangle_{y_i \in OFDM\ symbol\ that\ does\ not\ include\ a\ CRS} - S\right)} \right\} \quad (17)$$

An average of "< >" in the numerator in the above-described formula (17) corresponds to an average of power of received signals in the OFDM symbols that include a CRS. The interference power ratio calculation unit 50 may use all of the 0th, fourth, seventh, and eleventh OFDM symbols, or may use merely a part of the OFDM symbols in order to reduce a calculation amount. In addition, the interference power ratio calculation unit 50 may omit signals in a part of subcarriers.

An average of "< >" in the denominator in the above-described formula (17) corresponds to an average of power of received signals in the OFDM symbols that does not include a CRS. The interference power ratio calculation unit 50 may use all of the first, second, third, fifth, sixth, eighth, ninth, tenth, twelfth, and the thirteenth OFDM symbols, or may merely use a part of the OFDM symbols in order to reduce a calculation amount. In addition, the interference power ratio calculation unit 50 may omit signals in a part of subcarriers. When the values $M_{OC2,est1}$ and $M_{OC2,est2}$ are not equal, the interference power ratio calculation unit 50 may not include the 0th OFDM symbol in the average of "< >" in the numerator.

The interference noise power calculation unit 51 calculates an interference noise power estimation value $M_{OC1,est}$ in accordance with the following formula (18) and inputs the value to the demodulation unit 37.

$$M_{OC1,est} = M_{OC2,est2} \times 10^{-Y/10} \quad (18)$$

In addition, when the ratio Y of the interference noise power is larger than or equal to a specific threshold value β, the interference noise power calculation unit 51 may calculate the interference noise power estimation value $M_{OC1,est}$ in accordance with the above-described formula (18). When the ratio Y of the interference noise power is less than the threshold value β, the interference noise power calculation unit 51 may determine "$M_{OC1,est} = M_{OC2,est2}$".

Figure 21:
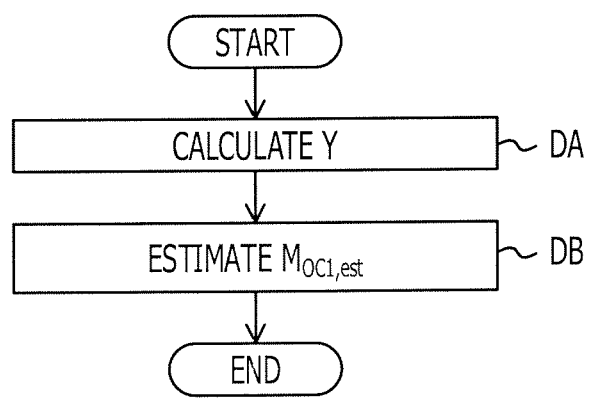
FIG. 21 is a diagram illustrating an example of an estimation operation of an interference noise power estimation value $M_{OC1,est}$.

FIG. 21 is a diagram illustrating an example of an estimation operation of an interference noise power estimation value $M_{OC1,est}$. In Operation DA, the interference power ratio calculation unit 50 receives a received signal $y_t$, a signal power estimation value S, and interference noise power estimation values $M_{OC2,est1}$ and $M_{OC2,est2}$. The interference power ratio calculation unit 50 calculates a decibel representation Y of a ratio of interference noise power in the OFDM symbol that includes a CRS to interference noise power in the OFDM symbol that does not include a CRS. In Operation DB, the interference noise power calculation unit 51 calculates an interference noise power estimation value $M_{OC1,est}$.

In the embodiment, in a radio frame that includes a reference signal and does not include data, different interference noise power may be calculated depending on an OFDM symbol. Therefore, even when interference noise power is changed depending on an OFDM symbol in the radio frame, the channel estimation processing or the demodulation processing may be executed for each different interference noise power. As a result, an error in the channel estimation processing or the demodulation processing is reduced.

5. Fourth Embodiment

Figure 22:
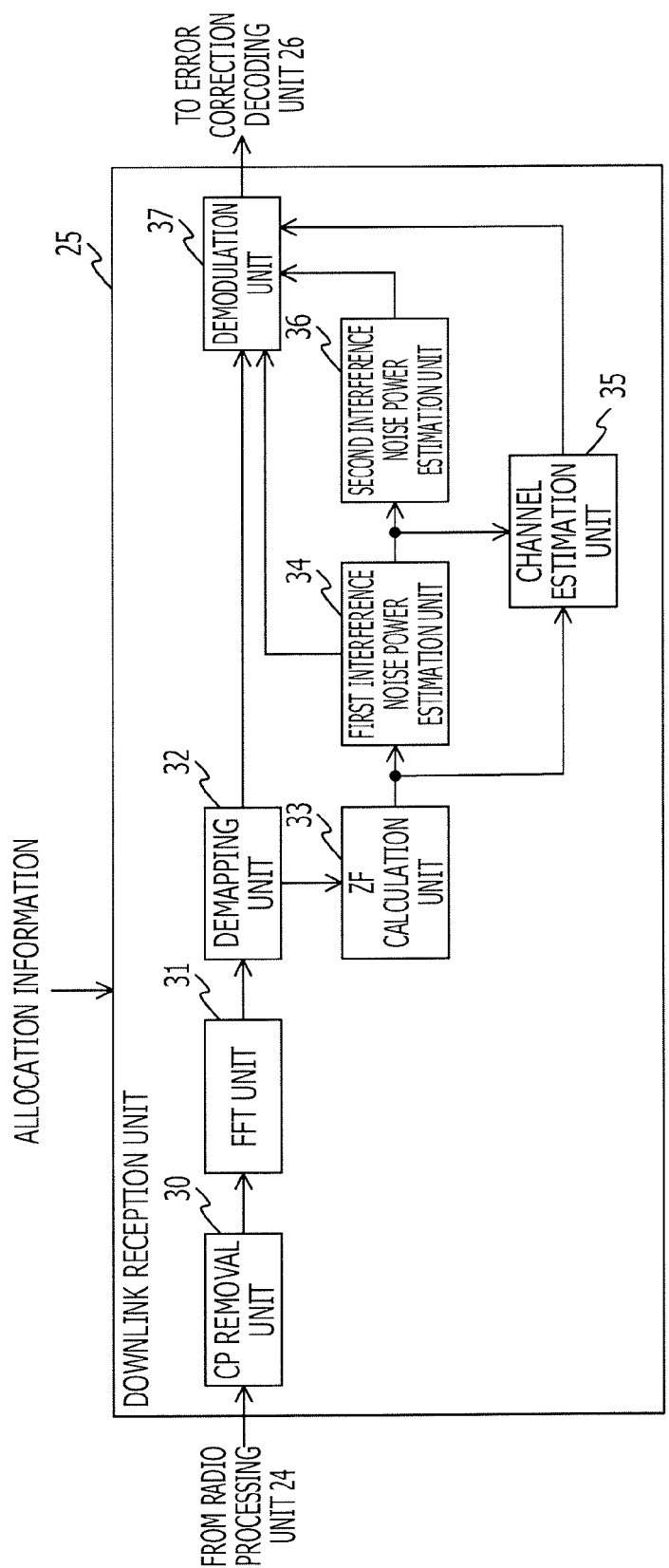
FIG. 22 is a functional block diagram illustrating a third example of the downlink reception unit.

FIG. 22 is a functional block diagram illustrating a third example of the downlink reception unit 25. To configuration elements illustrated in FIG. 22 that are similar to the configuration elements illustrated in FIG. 8, the same reference numerals as FIG. 8 are assigned, and the description of the similar function is omitted herein.

The first interference noise power estimation unit 34 inputs the estimation values $\sigma_{est1}^2$ and $\sigma_{est2}^2$ and the interference noise power estimation values $M_{OC2,est1}$ and $M_{OC2,est2}$ to the second interference noise power estimation unit 36. The first interference noise power estimation unit 34 inputs an interference noise power estimation value $M_{OC3,est}$ that is calculated when the reception target subframe is not an ABS, to the second interference noise power estimation unit 36.

When "$\sigma_{est1}^2/\sigma_{est2}^2 \geq \alpha$" is satisfied, the second interference noise power estimation unit 36 calculates an interference noise power estimation value $M_{OC1,est}$ in accordance with the following formula (19). Here, "N" represents a subcarrier cycle in which a CRS is allocated. For example, when the macro cell includes two transmission antennas, "N=3" is satisfied.

$$M_{OC1,est} = (M_{OC2,est1} - M_{OC3,est} + (N-1)M_{OC2,est2})/(N-1) \quad (19)$$

The above-described formula (19) is described below. When a case is assumed in which transmission of an ABS is performed in all macro cells, "$N_{OC1}$" that is illustrated in FIGS. 4A to 5C merely includes interference from pico cells other than a serving cell 5. Therefore, "$N_{OC1}$=(interference from the pico cells other than the serving cell 5) is obtained.

In addition, "$N_{OC2}$" includes interference from the pico cells other than the serving cell 5 and interference by a CRS that is transmitted from macro cells other than the dominant macro cell 6. When a case is assumed in which a cell has a random ID, the CRS that is transmitted from the macro cells other than the dominant macro cell 6 has power of 1/N. Therefore, "$N_{OC2}$=(interference from the pico cells other than the serving cell 5)+(interference from the macro cells other than the dominant macro cell 6)/N" is obtained.

In addition, "$N_{OC3}$" includes interference from the pico cells other than the serving cell 5 and interference from the macro cells other than the dominant macro cell 6. Therefore, "$N_{OC3}$=(interference from the pico cells other than the serving cell 5)+(interference from the macro cells other than the dominant macro cell 6)" is obtained.

As described above, the relational expression "$N_{OC3}$=N× $N_{OC2}$−(N−1)×$N_{OC1}$" is obtained. The above-described formula (19) is obtained from "$M_{OC2,est1}$=($N_{OC2}$+I)", "$M_{OC3,est}$=($N_{OC3}$+I)", and "$M_{OC2,est2}$=$N_{OC2}$".

In addition, when "$\sigma_{est1}^2/\sigma_{est2}^2<\alpha$" is satisfied, the second interference noise power estimation unit 36 determines "$M_{OC1,est}$=$M_{OC2,est2}$".

In the embodiment, in a radio frame that includes a reference signal and does not include data, different interference noise power may be calculated depending on an OFDM symbol. Therefore, even when interference noise power is changed depending on an OFDM symbol in the radio frame, the channel estimation processing or the demodulation processing may be executed for each different interference noise power. As a result, an error in the channel estimation processing or the demodulation processing is reduced.

6. Fifth Embodiment

In the above-described embodiments, each interference noise power is estimated in a state in which interference noise power is different between the leading OFDM symbol, the OFDM symbol that includes a CRS and is not the leading OFDM symbol, and the OFDM symbol that does not include a CRS. Such a state occurs, for example, when the eICIC control is performed.

Figure 23:
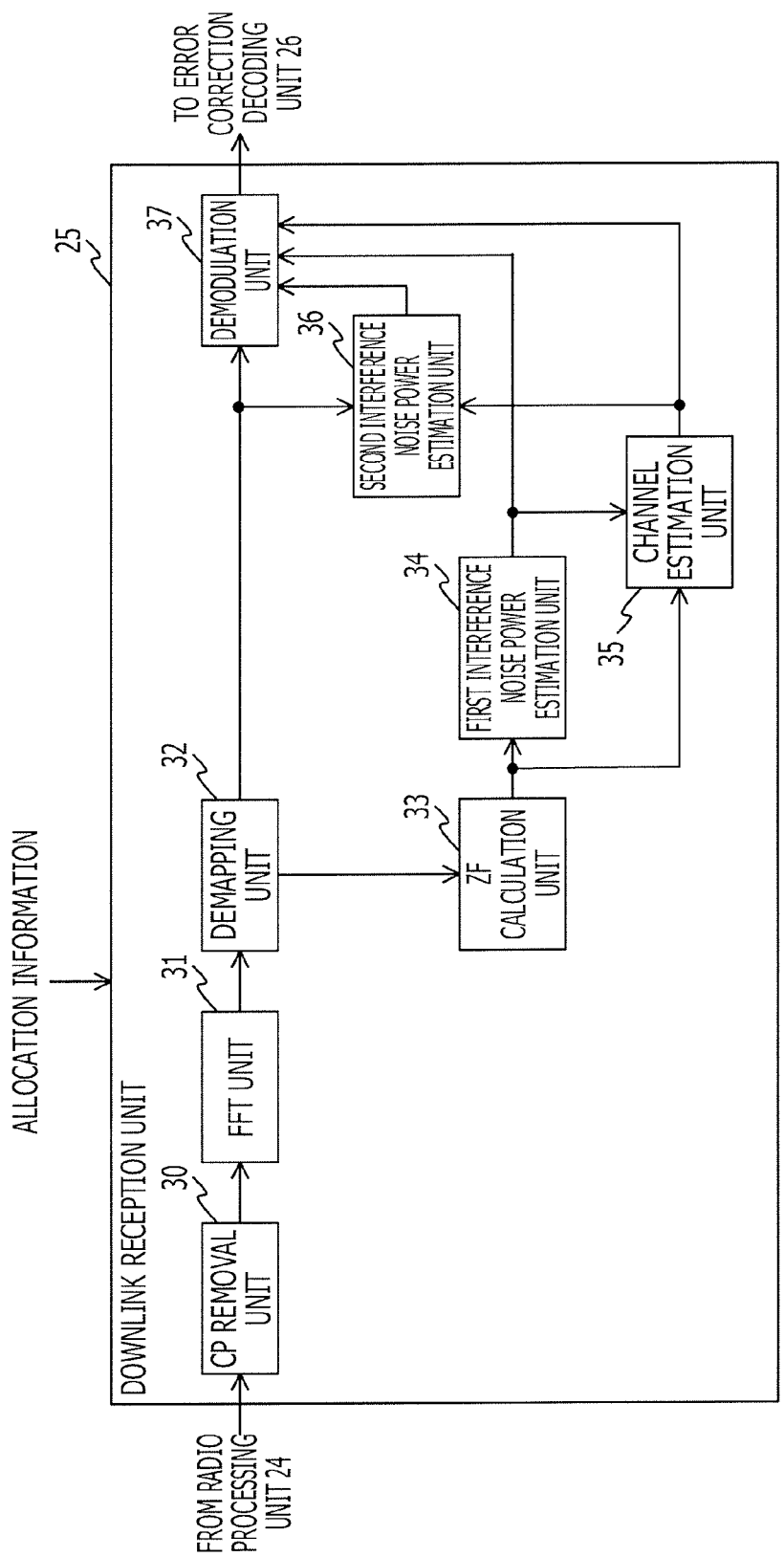
FIG. 23 is a functional block diagram illustrating a fourth example of the downlink reception unit.

In a fifth embodiment, a communication system is described in which interference noise power is more generally dynamically changed for each of the OFDM symbols. FIG. 23 is a functional block diagram illustrating a fourth example of the downlink reception unit 25. To configuration elements illustrated in FIG. 23 that are similar to the configuration elements illustrated in FIG. 9, the same reference numerals as FIG. 9 are assigned, and the description of the similar function is omitted herein.

The first interference noise power estimation unit 34 estimates interference noise power estimation values $\sigma_2^2(t)$ in OFDM symbols of t=0, 4, and 7 each of which includes a CRS. The first interference noise power estimation unit 34 may estimate the interference noise power estimation value $\sigma_2^2(t)$, for example, by a method similar to the calculation method of the interference noise power estimation values $M_{OC2,est1}$ and $M_{OC2,est2}$ in the first embodiment.

The second interference noise power estimation unit 36 estimates interference noise power estimation values $\sigma_1^2(t)$ in OFDM symbols of t=1, 2, 3, 5, 6, 8, 9, 10, 12, and 13 each of which does not include a CRS. The second interference noise power estimation unit 36 may estimate the interference noise power estimation value $\sigma_1^2(t)$, for example, by a method similar to the calculation method of the value $M_{OC1,est1}$ in the first embodiment, using a received signal that does not include a CRS and a channel estimation value.

The demodulation unit 37 calculates a signal z^ after demodulation for a data portion of an OFDM symbol that includes a CRS, in accordance with the following formula (20).

$$z^{\wedge}=H^H(H'H^H+\sigma_2^2(t)\Gamma)^{-1}y^{\wedge} \quad (20)$$

The demodulation unit 37 calculates a signal z^ after demodulation for a data portion of an OFDM symbol that does not include a CRS, in accordance with the following formula (21).

$$z^{\wedge}=H^H(H'H^H+\sigma_1^2(t)\Gamma)^{-1}y^{\wedge} \quad (21)$$

In the embodiment, in the communication system in which interference noise power is more generally dynamically changed for each of the OFDM symbols, different interference noise power may be calculated depending on an OFDM symbol. Therefore, even when interference noise power is changed depending on an OFDM symbol in a radio frame, the channel estimation processing or the demodulation processing may be executed for each different interference noise power. As a result, an error in the channel estimation processing or the demodulation processing is reduced.

7. Hardware Configuration

Figure 24:
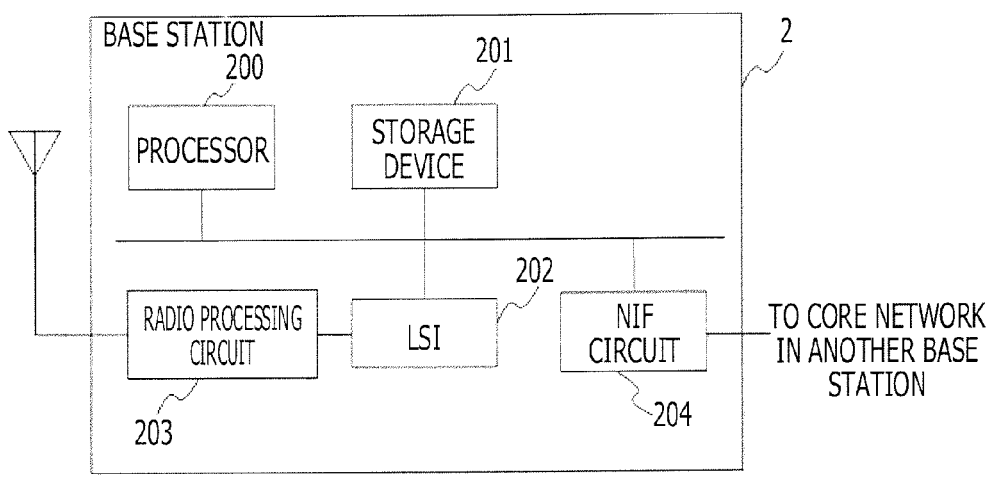
FIG. 24 is a diagram illustrating an example of a hardware configuration of the pico base station device.

FIG. 24 is a diagram illustrating an example of a hardware configuration of the pico base station 2. The pico base station 2 includes a processor 200 that is a central processing unit (CPU) or the like, a storage device 201, large scale integration (LSI) 202, a radio processing circuit 203, and a network interface circuit 204. Hereinafter, the network interface may be referred to as "NIF".

The storage device 201 may include a non-volatile memory, a read only memory (ROM), a random access memory (RAM), and a hard disk drive device, that are used to store a computer program and data. The processor 200 executes operation control of the pico base station 2 and user management processing other than processing that is executed by the LSI 202, which is described below, in accordance with the computer program that is stored in the storage device 201.

The LSI 202 executes coding and modulation, demodulation and decoding, communication protocol processing, and processing of a baseband signal related to scheduling, for a signal that is transmitted and received between the mobile station 3 and the pico base station 2. The LSI 202 may include a field-programming gate array (FPGA), an application specific integrated circuit (ASIC), and a digital signal processor (DSP).

The radio processing circuit 203 may include a digital/analog conversion circuit, an analogue/digital conversion circuit, a frequency conversion circuit, an amplification circuit, and a filter circuit. The NIF circuit 204 includes an electronic circuit that is used to communicate with a higher level node device through a wired network using a physical layer and a data link layer.

The above-described operations of the uplink reception unit 10 and the downlink transmission unit 14 of the pico base station 2 illustrated in FIG. 6 are executed by the cooperation of the radio processing circuit 203 and the LSI 202. The above-described operations of the allocation information generation unit 11 and the data generation unit 12 are executed by the processor 200. The above-described operation of the error correction coding unit 13 is executed by the processor 200 and/or the LSI 202.

Figure 25:
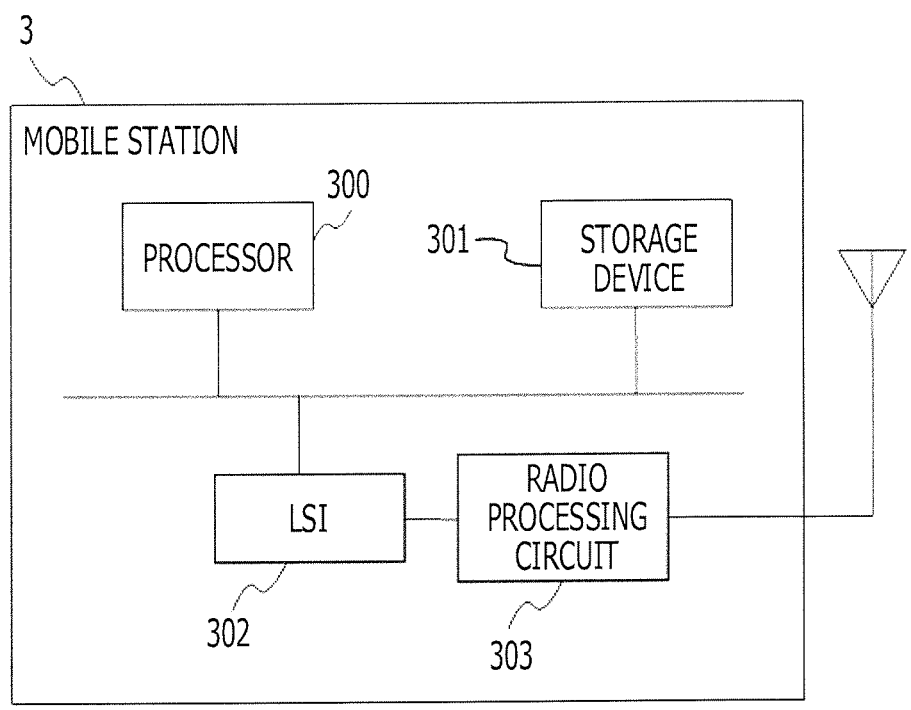
FIG. 25 is a diagram illustrating an example of a hardware configuration of the mobile station device.

FIG. 25 is a diagram illustrating an example of a hardware configuration of the mobile station 3. The mobile station 3 includes a processor 300, a storage device 301, a LSI 302, and a radio processing circuit 303. The storage device 301 may include a non-volatile memory, a ROM, and a RAM, which are used to store a computer program and data.

The processor 300 executes an application program that processes user data and operation control of the mobile station 3 other than processing that is executed the LSI 302, which is described below, in accordance with a computer program that is stored in the storage device 301.

The LSI 302 executes coding and modulation, demodulation and decoding, communication protocol processing, and processing of a baseband signal related to scheduling, for a signal that is transmitted and received between the mobile station 3 and the pico base station 2. The LSI 302 may include a FPGA, an ASIC, and a DSP. The radio processing circuit 303 may include a digital/analog conversion circuit, an analogue/digital conversion circuit, and a frequency conversion circuit.

The above-described operations of the radio processing units 23 and 24 of the mobile station 3 illustrated in FIG. 7 are executed by the radio processing circuit 303. The above-described operations of the error correction coding unit 21, the uplink transmission unit 22, the downlink reception unit 25, and the error correction decoding unit 26 are executed by the processor 300 and/or the LSI 302. The above-described operations of the uplink data generation unit 20 and the allocation information extraction unit 27 are executed by the processor 300.

The hardware configurations that are illustrated in FIGS. 24 and 25 are merely examples for the description of the embodiments. Any hardware configuration may be applied to the base station and the mobile station discussed herein as long as the hardware configuration executes the above-described operations.

In the functional block diagrams in FIGS. 6 to 9, 17, 19, 20, 22, and 23, the configurations that are related to the functions discussed herein are mainly illustrated. The pico base station 2, the mobile station 3, the downlink reception unit 25, the second interference noise power estimation unit 36, and the first interference noise power estimation unit 34 may include a configuration element other than the illustrated configuration elements. In addition, a series of operations that are described with reference to FIGS. 15, 16, 18, and 21 may be interrupted as a method that includes a plurality of procedures. In this case, "Operation" may be replaced with "Step".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reception device comprising:
an antenna configured to receive a radio signal including a radio frame that includes a plurality of symbols; and
a processor configured
to perform a first processing for estimating a first interference noise power for one or more first specified symbols of the plurality of symbols, each of the one or more first specified symbols including each of one or more reference signals respectively, and
to perform a second processing for estimating a second interference noise power for one or more second specified symbols of the plurality of symbols, each of the one or more second specified symbols including no reference signal, the second interference noise power differing from the first interference noise power.

2. The reception device according to claim 1, wherein the processor is configured to perform both of the first processing and the second processing, when the reception device communicates with a transmission device and when another transmission device transmits no data in the radio frame.

3. The reception device according to claim 2, wherein the other transmission device transmits at least one reference signals in the radio frame.

4. The reception device according to claim 2, wherein the first processing includes a third processing and a fourth processing, the third processing is performed for estimating a third interference noise power for a third specified symbol of the one or more first specified symbols in which a reference signal is transmitted by the other transmission device when the radio frame transmitted from the other transmission device is any of types, the fourth processing is performed for estimating a fourth interference noise power for a fourth specified symbol of the one or more first specified symbols in which a reference signal is transmitted by the other transmission device when the radio frame transmitted from the other transmission device is a specified type of the types, and the processor is configured to estimate the first interference noise power by using the third interference noise power and the fourth interference noise power.

5. The reception device according to claim 4, wherein the first processing further includes a fifth processing, the fifth processing is performed for estimating a fifth interference noise power based on both the third specified symbol and the fourth specified symbol, the processor is configured to set the fifth interference noise power to the first interference noise power when a condition that the third interference noise power are close to the fourth interference noise power is satisfied.

6. The reception device according to claim 1, wherein the processor is configured to perform a channel estimation based on the one or more first specified symbols, and the processor is configured, in the second processing, to estimate the second interference noise power based on the one or more second specified symbols and the channel estimation.

7. The reception device according to claim 1, wherein the plurality of symbols is a plurality of Orthogonal Frequency Division Multiplexing (OFDM) symbols.

8. A reception device comprising:
a memory; and
a processor configured
to receive a radio signal including a radio frame that includes a plurality of symbols,
to perform a first processing for estimating a first interference noise power for one or more first specified symbols of the plurality of symbols, each of the one or more first specified symbols including each of one or more reference signals respectively, and
to perform a second processing for estimating a second interference noise power for one or more second specified symbols of the plurality of symbols, each of the one or more second specified symbols including no reference signal, the second interference noise power differing from the first interference noise power.

9. A reception method comprising:
receiving, by a reception device, a radio signal including a radio frame that includes a plurality of symbols;
performing, by the reception device, a first processing for estimating a first interference noise power for one or more first specified symbols of the plurality of symbols, each of the one or more first specified symbols including each of one or more reference signals respectively; and
performing, by the reception device, a second processing for estimating a second interference noise power for one or more second specified symbols of the plurality of symbols, each of the one or more first specified symbols including no reference signal, the second interference noise power differing from the first interference noise power.

10. The reception method according to claim 9, wherein the reception device is configured to perform both of the first processing and the second processing, when communicating with a transmission device and when another transmission device transmits no data in the radio frame.

11. The reception method according to claim 9, wherein the other transmission device transmits at least one reference signals in the radio frame.

12. The reception method according to claim 9, wherein the first processing includes a third processing and a fourth processing, the third processing is performed for estimating a third interference noise power for a third specified symbol of the one or more first specified symbols in which a reference signal is transmitted by the other transmission device when the radio frame transmitted from the other transmission device is any of types, the fourth processing is performed for estimating a fourth interference noise power for a fourth specified symbol of the one or more first specified symbols in which a reference signal is transmittable by the other transmission device when the radio frame transmitted from the other transmission device is a specified type of the types, and the estimating of the first interference noise power is based on the third interference noise power and the fourth interference noise power.

13. The reception method according to claim 12, wherein the first processing further includes a fifth processing, the fifth processing is performed for estimating a fifth interference noise power based on both the third specified symbol and the fourth specified symbol, the estimating of the first interference noise power sets the fifth interference noise power to the first interference noise power when a condition that the third interference noise power are close to the fourth interference noise power is satisfied.

14. The reception method according to claim 9, further comprising:
performing a channel estimation based on the one or more first specified symbols,
wherein in the second processing, the estimating of the second interference noise power is based on the one or more second specified symbols and the channel estimation.

15. The reception method according to claim 9, wherein the plurality of symbols is a plurality of Orthogonal Frequency Division Multiplexing (OFDM) symbols.

* * * * *